(12) United States Patent
Wakashiro

(10) Patent No.: US 6,650,764 B1
(45) Date of Patent: Nov. 18, 2003

(54) DEVICE FOR CALCULATING POSITIONAL DATA OF STANDARD POINTS OF A PHOTOGRAMMETRIC TARGET

(75) Inventor: Shigeru Wakashiro, Tokyo (JP)

(73) Assignee: Pentax Corporation, Tokyo (JP)

( * ) Notice: Subject to any disclaimer, the term of this patent is extended or adjusted under 35 U.S.C. 154(b) by 0 days.

(21) Appl. No.: 09/449,830

(22) Filed: Nov. 26, 1999

(30) Foreign Application Priority Data

Mar. 1, 1999 (JP) ............................ 11-052525

(51) Int. Cl.[7] ................................ G06K 9/00
(52) U.S. Cl. ................ 382/103; 382/291; 356/620
(58) Field of Search .................. 348/42, 94, 137, 348/140, 143, 149; 356/3.1, 4.01, 12, 14, 620, 4.03, 614; 382/103, 106, 153, 154

(56) References Cited

U.S. PATENT DOCUMENTS 4,672,562 A * 6/1987 Egli et al. .................. 348/140
5,699,444 A   12/1997 Palm ......................... 382/106
5,805,289 A * 9/1998 Corby et al. ................. 356/613

FOREIGN PATENT DOCUMENTS

| JP | 7139942  | 6/1995 |
| JP | 10221072 | 8/1998 |

* cited by examiner

Primary Examiner—Amelia M. Au
Assistant Examiner—Colin LaRose
(74) Attorney, Agent, or Firm—Greenblum & Bernstein, P.L.C.

(57) ABSTRACT

A first points range of high brightness and a second points range of high brightness in a photographed image are selected. It is checked if an identical end point is shared by the three and four points range selected. A first straight line, connecting a center of gravity corresponding to the identical end point and a center of gravity corresponding to another end point of the first points range opposite to the identical end point, is calculated. A second straight line, connecting the center of gravity corresponding to the identical end point and a center of gravity corresponding to another end point of the second points range opposite to the identical end point, is calculated. It is checked if an angle, defined by the first and second straight lines, is within a predetermined limit.

11 Claims, 16 Drawing Sheets

FIG. 10
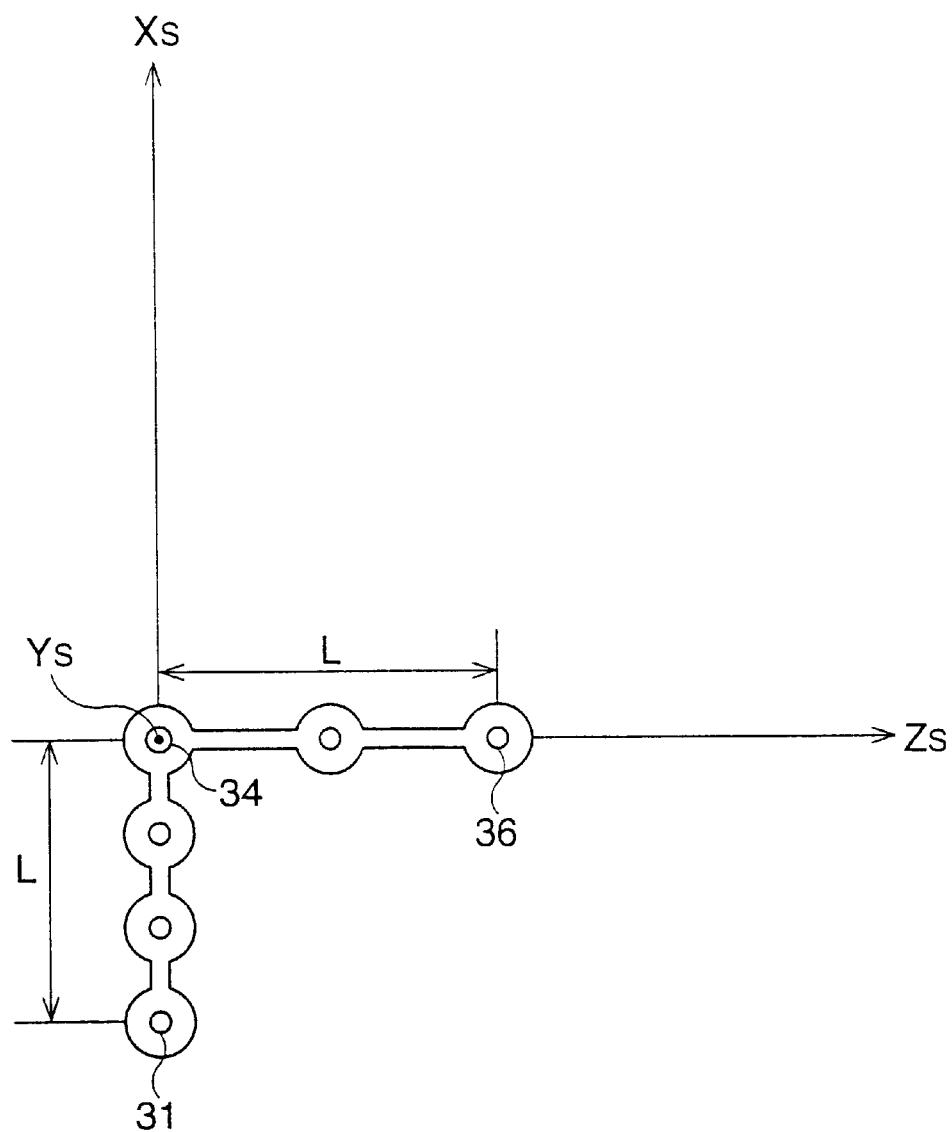
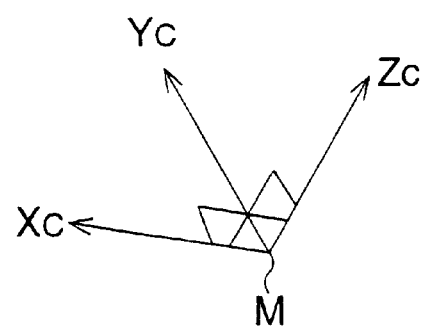

DEVICE FOR CALCULATING POSITIONAL DATA OF STANDARD POINTS OF A PHOTOGRAMMETRIC TARGET

BACKGROUND OF THE INVENTION

1. Field of the Invention

This invention relates to a calculation of camera position (photographing position) in a photogrammetric analytical measurement system, in which a survey map is produced on the basis of a set of photographed pictures obtained at two different photographing positions.

2. Description of the Related Art

For example, photogrammetry is carried out at a traffic accident spot. The traffic accident spot is photographed by a camera in at least two different positions, and a survey map of the traffic accident spot is produced based on a set of photographed pictures obtained at the different positions.

In particular, a two-dimensional coordinate system is defined on each of the photographed pictures, and two-dimensional positions of the objects, which are recorded on each picture, are determined by the two-dimensional coordinate system. Then, a three-dimensional coordinate system is defined on the basis of the two sets of two-dimensional coordinate systems, and three-dimensional positions of the recorded objects are determined from the three-dimensional coordinate system. Accordingly, it is possible to produce a survey map of the traffic accident spot by drawing the objects on a sheet of paper in such a manner that the objects are projected on one of the three planes defined by the three-dimensional system.

Before accurately scaled distances and lengths can be reproduced on the survey map, a standard measurement scale must be recorded together with the objects in the photographed pictures. Also, a standard reference plane, on which the survey map should be drawn, must be defined in the photographed pictures.

Usually, in order to define the standard measurement scale and the reference plane, three respective cone-shaped markers, which are identical to each other, are positioned at suitable locations around a traffic accident spot. Namely, a distance between two apexes of the cone-shaped markers is measured, for example, with a measuring tape, and set as the standard measurement scale, and a plane, defined by the three apexes of the cone-shaped markers, is utilized as the reference plane. As the positioning of the cone-shaped markers and the measurement of the distance between the two apexes are performed by operators, a process of preparing for photographing is onerous and requires a lot of time.

In order to solve the above mentioned problems, photogrammetric analytic measurement, using a target which has a triangular frame instead of the three cone-shaped markers, is disclosed in Japanese Unexamined Patent Publication (Kokai) No. P10-221072. Standard point members are respectively mounted on each of three apexes of the target. A distance between the standard point members is set as the standard measurement scale, and a plane defined by the standard point members is utilized as the reference plane. A reflecting sheet, for example, is attached on the standard point members so that the standard point members can be viewed easily in photographed pictures.

The determination of the three-dimensional positions of the recorded objects from the three-dimensional coordinate system is carried out by iterating a series of approximate calculations, using a computer having a monitor on which the set of photographed pictures is displayed.

Initially, before a first series of approximate calculations is executed, the standard point members and a suitable point on one of the recorded objects in the set of photographed pictures displayed on the monitor, are selected with a cursor, by manipulating a mouse, whereby three sets of two-dimensional coordinates, corresponding to the standard point members, and a set of two-dimensional coordinates on the suitable point of the selected object are inputted to the computer. Namely, the execution of the first series of approximate calculations is based upon the inputted two-dimensional coordinates of the standard point members and the inputted two-dimensional coordinates of the suitable point on the selected object, thereby determining three-dimensional positions of the standard point members and a three-dimensional position of the suitable point of the selected object from the three-dimensional coordinate system.

Then, another suitable point on the selected object in the set of photographed pictures displayed on the monitor is indicated with the cursor, by manipulating the mouse, whereby a set of two-dimensional coordinates of the other suitable point on the selected object is inputted to the computer, and a second series of approximate calculations is executed on the basis of the inputted two-dimensional coordinates of the other suitable point on the selected object, thereby determining a three-dimensional position of the other suitable point on the selected object from the three-dimensional coordinate system. This procedure is continued until a sufficient number of points on the selected object are indicated, to thereby specify a three-dimensional profile of the selected object.

The aforementioned series of approximate calculations is executed based on positional data of the camera at which the pictures are photographed. The positional data of the camera includes a distance from the camera to the selected object, an angle of the camera against the object. The positional data of the camera is calculated based on the two-dimensional coordinates of the standard point members selected by the operator.

However, it takes a comparatively long time to select the standard point members in the set of photographed pictures displayed on the monitor, with the cursor, by manipulating the mouse. Therefore, when there are a lot of the photographed pictures, it becomes onerous for the operator to operate the above mentioned manipulation of the mouse. Further, the accuracy of the photogrammetric analytic measurement is dependent upon the skill of the operator.

SUMMARY OF THE INVENTION

Therefore, an object of the present invention is to provide a device for calculating positional data of standard points of a target of photogrammetric analytic measurement.

In accordance with an aspect of the present invention, there is provided a device, for calculating positional data of standard points of a target of photogrammetric analytic measurement, comprising an image data obtaining processor and a value of two-dimensional coordinates calculating processor.

The image data obtaining processor photographs an object of photogrammetric analytic measurement with a target that has a first standard point and a second standard point and a third standard point.

The first standard point, the second standard point and the third standard point are positioned with a predetermined interval between. At least one assistant point is provided on each of a first straight line, connecting the first standard point and the second standard point, and a second straight line, connecting the second standard point and the third standard point. The first straight line and the second straight line defines a predetermined angle.

The value of two-dimensional coordinates calculating processor calculates each two-dimensional coordinate value of the first standard point, the second standard point and the third standard point in a photograph coordinate system that is a two-dimensional coordinate system of a photographed image, obtained by the image data obtaining processor, on a condition that the predetermined angle is within a predetermined limit.

The first standard point, the second standard point, the third standard point and at least one assistant point provided on each of the first straight line and the second straight line are made of a reflecting material, such that the first standard point, the second standard point, the third standard point and each of at least one assistant point have a relatively higher brightness than other objects in the photographed image.

The value of two-dimensional coordinates calculating processor is provided with: a binarization processor that classifies each pixel composing of digital image data of the photographed image into a high brightness class and a low brightness class after comparing a brightness of each pixel with a predetermined threshold value; a group extracting processor that extracts groups in which a plurality of the pixels of the high brightness class sequentially exist in the digital image data, an area of which is within a predetermined range; a calculating processor that calculates a value of two-dimensional coordinates of a center of gravity of each of the groups, based on the brightness of each pixel composing the groups and on a value of coordinates of the each pixel in the photograph coordinate system; a first points range extracting processor that extracts a first points range on which a plurality of the centers of gravity lie, a number of the plurality of the centers of gravity on the first points range being equal to a total point number including the first standard point, the second standard point and the number of at least one assistant points on the first straight line; a second points range extracting processor that extracts a second points range on which a plurality of the centers of gravity lie, a number of the plurality of the centers of gravity on the second points range being equal to a total point number including the second standard point, the third standard point and the number of at least one assistant points on the second straight line; a combination extracting processor that extracts a combination of the first points range and the second points range in which an angle defined by the first points range and the second points range is within the predetermined limit; and a standard point determining processor that determines a center of gravity of an end point of the first points range extracted by the combination extracting processor, being opposite to an identical end point shared by the first points range and the second points range extracted by the combination extracting processor, as the first standard point, determines the center of gravity of the identical end point shared by the first points range and the second points range extracted by the combination extracting processor, as the second standard point, and determines a center of gravity of an end point of the second points range extracted by the combination extracting processor, being opposite to the identical end point shared by the first points range and the second points range extracted by the combination extracting processor, as the third standard point.

The predetermined angle defined by the first straight line and the second straight line is an angle by which the second straight line is rotated in the counterclockwise direction from the first straight line.

The predetermined limit is larger than 0 degrees, and smaller than 180 degrees.

The target is a single member comprising connectable members on which the first standard point, the second standard point, the third standard point, at least one assistant point on the first straight line, and at least one assistant point on the second straight line, are fixed.

In accordance with another aspect of the present invention, there is provided a method for calculating positional data of standard points of a target of photogrammetric analytic measurement comprising: a first step that photographs an object of photogrammetric analytic measurement with a target that has a first standard point and a second standard point and a third standard point, by a camera; and a second step that calculates each two-dimensional coordinate value of the first standard point, the second standard point and the third standard point in a photograph coordinate system that is a two-dimensional coordinate system of a photographed image photographed by the camera.

The first standard point, the second standard point and the third standard point are positioned with a predetermined interval between. At least one assistant point is provided on each of a first straight line, connecting the first standard point and the second standard point, and a second straight line, connecting the second standard point and the third standard point. The first straight line and the second straight line defines a predetermined angle.

In the second step, each two-dimensional coordinate value of the first standard point, the second standard point and the third standard point in the photograph coordinate system, is calculated, on a condition that the angle is within a predetermined limit.

In accordance with another aspect of the present invention, there is a provided a recording medium in which a calculating program of standard points of a target of photogrammetric analytic measurement is stored.

The target has a first standard point and a second standard point and a third standard point. The first standard point, the second standard point and the third standard point are positioned with a predetermined interval between. At least one assistant point is provided on each of a first straight line, connecting the first standard point and the second standard point, and a second straight line, connecting the second standard point and the third standard point. The first straight line and the second straight line defines a predetermined angle.

The calculating program comprises: a values of two-dimensional coordinate calculating routine that calculates each two-dimensional coordinate value of the first standard point, the second standard point and the third standard point in a photograph coordinate system that is a two-dimensional coordinate system of a photographed image, photographed in such a manner that an object of photogrammetric analytic measurement is photographed with the target by a camera, on a condition that the angle is within a predetermined limit.

BRIEF DESCRIPTION OF THE DRAWINGS

The object and other objects of the present invention will be better understood from the following description, with reference to the accompanying drawings, in which:

FIG. 10 is a conceptual view of a relationship between a scene coordinate system and a camera coordinate system;

DESCRIPTION OF THE PREFERRED EMBODIMENTS

Figure 1:
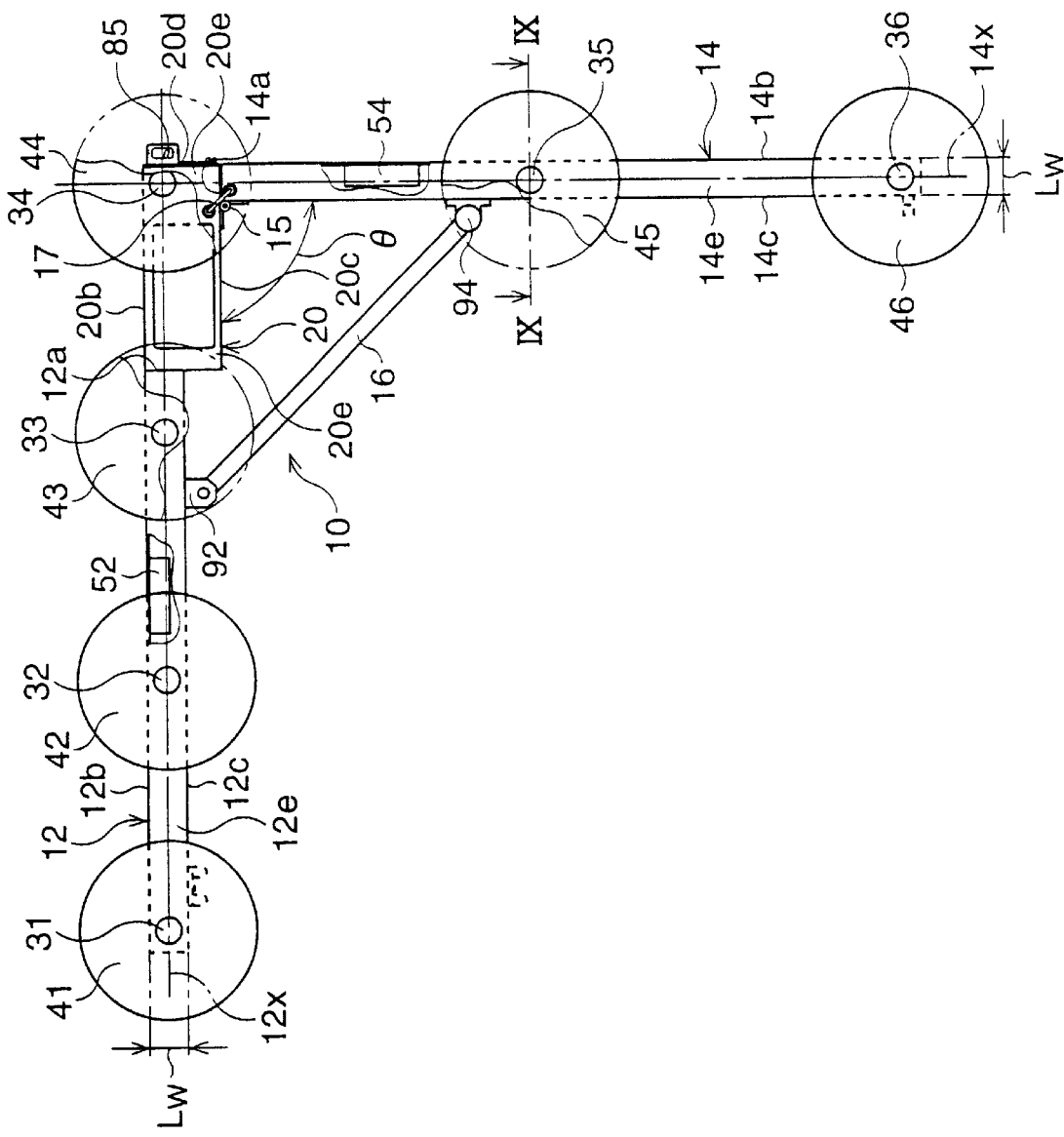
FIG. 1 is a plan view of a target in an operational state, to which an embodiment, according to the present invention, is applied.
Figure 2:
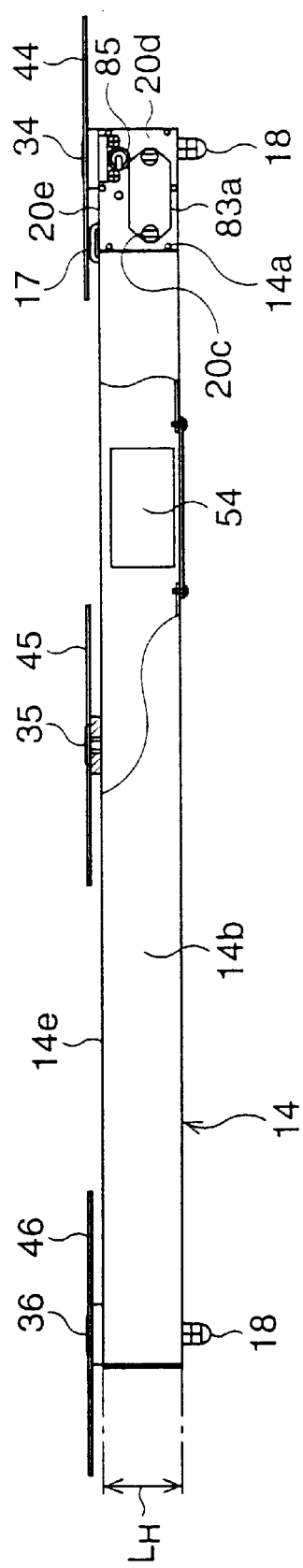
FIG. 2 is a side view of the target of FIG. 1.

FIG. 1 is a plan view of the target 10, with portions broken away for clarity, and FIG. 2 is a side view of the target 10. The target 10 has an L-shaped figure, comprising a first bar 12 and a second bar 14. The first and second bars 12, 14 are made of metal material. The first and second bars 12, 14 respectively have a shape of a quadratic prism, which is hollow. A non-reflecting sheet, which does not reflect light, is attached to the whole outer side surface of each of the first and second bars 12, 14. The width of each of the first and second bars 12, 14 is a length $L_W$, and the thickness of each of the first and second bars 12, 14 is a length $L_H$.

An adhesive is applied to the surface of the non-reflecting sheet, which contacts the surface of the bars 12, 14. The other surface of the sheet is colored black, and rough. Incident light on the black and rough surface is absorbed and diffused, so that a luminance amount of reflected light is extremely reduced. Note that, for example, a black flattering or matte agent can be applied on the outer surface of each of the first and second bars 12, 14, instead of utilizing the non-reflecting sheet.

A controlling unit box 20, which is shaped parallelepiped, is unitarily fixed at one end of the first bar 12. The controlling unit box 20 is made of metal material. The non-reflecting sheet is attached to the whole outer surface of the controlling unit box 20. The thickness of the controlling unit box 20 equals the thickness $L_H$ of the first bar 12. The width of the controlling unit box 20 is twice the width $L_W$ of the first bar 12. The controlling unit box 20 is positioned in such a manner that a side surface 20b and a side surface 12b of the bar 12 lie on a same plane. A side surface 20c of the controlling unit box 20 is parallel to a side surface 12c of the bar 12, being offset in a direction opposite to the side surface 20b.

One end 14a of the second bar 14 is rotatably mounted on the side surface 20c of the controlling unit box 20, by a hinge 15. A side surface 14b of the second bar 14 and an end surface 20d of the controlling unit box 20, opposite to the end surface at which the first bar 12 is fixed, lie on a same plane, when the target 10 is utilized for the aforementioned photogrammetry.

As shown in FIG. 1, the side surface 14c of the second bar 14 and the side surface 20c of the controlling unit box 20 define an angle θ. Namely, the angle θ is a right angle made by an axis 12x (represented as a broken line) of the first bar 10 12 and an axis 14x (represented as a broken line) of the second bar 14. A stay 16, which is a fixing member, is connected to the first and second bars 12, 14, at the side of the angle θ. Rotational movement of the second bar 14 is prevented by the stay 16, so that the positional relationship between the first and the second bars 12, 14, shown in FIG. 1, is maintained. The width and the thickness of the stay 16 are respectively smaller than the length $L_W$ and $L_H$, of the first and second bars 12, 14. Further, a length along the longitudinal direction of stay 16 is shorter than the length of the longitudinal direction of the first and second bars 12, 14.

The stay 16 is rotatably connected to the first bar 12 by a stay hinge 92, being attachable to and removable from the second bar 14 by a lock hinge 94. When the target 10 is utilized in an operational position shown in FIG. 1, the stay 16 is positioned so as to make a predetermined angle with each of the first and second bars 12, 14, so that the first and second bars 12, 14 make a right angle.

On the top surface of the target 10, namely, on the top surfaces of the bars 12, 14 and the controlling unit box 20, three standard point members 31, 34 and 36, and three assistant point members 32, 33 and 35 are mounted. The standard point member 31 (first standard point member) is a circular plate, the diameter of which is smaller than the width $L_W$ of the first and second bars 12, 14. The standard point members 34 (second standard point member), 36 (third standard point member) and the assistant point members 32, 33 and 35 are identical to the standard point member 31.

The standard point member 31 and the assistant point members 32, 33 are mounted on the top surface 12e of the first bar 12. The standard point member 34 is mounted on the top surface 20e of the controlling unit box 20. The assistant point member 35 and the standard point member 36 are mounted on the top surface 14e of the second bar 14. The assistant point members 32 and 33 are positioned in such a manner that centers of the assistant point members 32 and 33 lie on a straight line (first straight line) parallel to the axis 12x, which connects a center of the standard point member 31 and a center of the standard point member 34. Also, the assistant point member 35 is positioned in such a manner that a center of the assistant point member 35 lies on a straight line (second straight line) parallel to the axis 14x, which connects a center of the standard point member 34 and a center of the standard point member 36.

As described above, there are two assistant point members (32, 33) on the straight line connecting the standard point members 31 and 34, and there is one assistant point member (35) on the straight line connecting the standard point members 34 and 36. Namely, the number of assistant point member on each of the straight lines is different from each other. Further, the distance between the center of the standard point member 31 and the center of the assistant point member 32, the distance between the center of the assistant point member 32 and the center of the assistant point member 33, and the distance between the center of the assistant point member 33 and the center of the standard point member 34, are identical to each other. The distance between the center of the standard point member 34 and the center of the assistant point member 35, and the distance between the center of the assistant point member 35 and the center of the standard point member 36, are identical to each other. Furthermore, the distance between the center of the standard point member 31 and the standard point member 34, and the distance between the center of the standard point member 34 and the center of the standard point member 36, are identical to each other.

The aforementioned reference plane for the photogrammetric analytical measurement is defined by the standard point members 31, 34 and 36, and the assistant point members 32, 33 and 35. The standard measurement length is defined by a side length of an isosceles triangle apexes of which correspond to the standard point members 31, 34 and 36. Namely, a length of the distance between the standard point members 34 and 36, and a length of the distance between the standard point members 36 and 31 can be used the standard measurement length, as they are predetermined.

Note that, the angle θ is not restricted to 90°, and it is unnecessary to make the distance between 31, 34 and the distance between 34, 36 equal to each other. Namely, it is required that each value of the angle θ, the length of the distance between the standard point members 31, 34 and the length of the distance between the standard point members 34, 36 are predetermined. Considering facility of calculation in the photogrammetric analytical measurement system, it is preferable that the value of the angle θ is predetermined to be 90° and the distance between the standard point members 31, 34 and the distance between the standard point members 34, 36 are equal to each other.

As is apparent from FIG. 1, on each of the equilaterals of the isosceles triangle, a number of the assistant point members is different. Accordingly, as a positional relationship between the target 10 and other objects in a picture can be easily judged, determination of the photographing position of each picture for the photogrammetric analytical measurement system is facilitated.

It is desirable that the standard plane defined by the standard point members 31, 34, 36 and the assistant point members 32, 33, 35 is parallel to the surface of a road on which the target 10 is positioned. As the controlling unit box 20 is mounted on the first bar 12, the first bar 12 is heavier than the second bar 14. Accordingly, if the second bar 14 is connected to the first bar 12 only by the hinge 15 at the end portion thereof, the second bar 14 rises from the surface of the road, so that the standard point member 31 and the assistant point members 32, 33 on the first bar 12 do not lie on the same plane on which the assistant point member 35 and the standard point member 36 on the second bar 14 lie. Also, the standard plane might not be parallel to the surface of the road.

Accordingly, the first and second bars 12, 14 are connected by the stay 16 at center portions thereof, in order to prevent the second bar 14 from rising from the surface of the road and to keep the standard plane parallel to the surface of the road for more accurate photogrammetric analytic measurement.

The mounting of the hinge 15 produces an interval between the side surface 20c of the controlling unit box 20 and the end surface 14a of the second bar 14. An elastic member 19 (see FIG. 5) is disposed in the interval. Accordingly, instability of the second bar 14 is prevented. The elastic ember 19 is made of, for example, rubber and sponge, being attached on the end surface 14a or the side surface 20c. Note that, a spring can be utilized instead of the elastic member 19.

A reflecting sheet is attached on the standard point members 31, 34, 36 and the assistant point members 32, 33, 35. As the surface of the reflecting sheet is smooth, and colored white, the amount of reflection of incident light on the sheet is high. The standard point members 31, 34 and 36 are respectively surrounded by non-reflecting members 41, 44 and 46. Similarly, the assistant point members 32, 33, 35 are respectively surrounded by non-reflecting members 42, 43 and 45. On the non-reflecting members 41, 42, 43, 44, 45 and 46, the non-reflecting sheet is attached, respectively. Accordingly, discrimination of the standard point members 31, 34, 36 and the assistant point members 32, 33, 35 in the pictures is facilitated, so that the photogrammetric analytic measurement can be performed accurately.

The target 10 comprises a first tilt sensor 52 and a second tilt sensor 54. Tilt angles of the target 10 around the axes 12x and 14x are sensed by the first and second tilt sensors 52, 54. The first tilt sensor 52 is mounted in the first bar 12, being placed between the assistant point members 32 and the standard point members 34. The tilt angle to a horizontal plane around the axis 12x is sensed by the first tilt sensor 52. The second tilt sensor 54 is mounted in the second bar 14, being placed between the standard point member 34 and the assistant point member 35. The tilt angle of the horizontal plane around the axis 14x is sensed by the second tilt sensor 54.

The first and second tilt sensors 52, 54 are connected to the controlling box 20 by a cable 17. Data of the tilt angles is transmitted to the controlling box 20 by the cable 17.

The angle of the standard plane to the horizontal plane is obtained by sensing the tilt angles around the axes 12x and 14x which are perpendicular to each other.

The target 10 comprises three legs 18. The legs 18 are mounted on the bottom surface opposite to the top surface on which the standard point members 31, 34, 36 and the assistant point members 32, 33, 35 are mounted. Each of the legs 18 respectively correspond to the standard point members 31, 34 and 36. In a spot for photogrammetric analytic measurement, the target 10 is supported above a road with the interval corresponding to the height of the leg 18 therebetween. Accordingly, the target 10 is positioned so as to be parallel to general inclination of the road, without being effected by roughness of the surface of the road.

Figure 3:
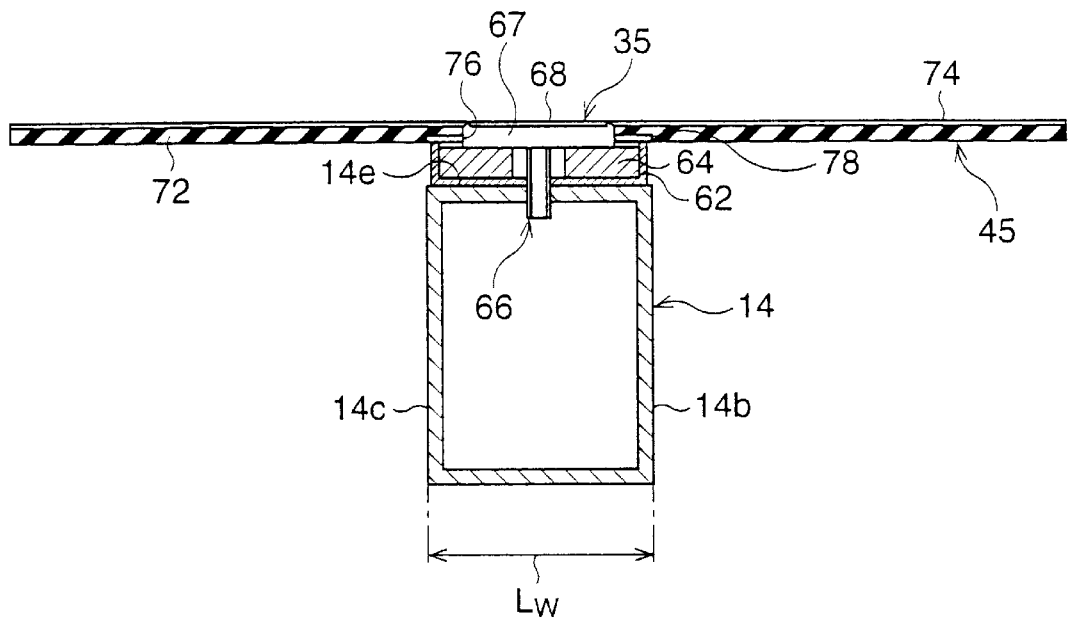
FIG. 3 is a sectional view of the target of FIG. 1.
Figure 4:
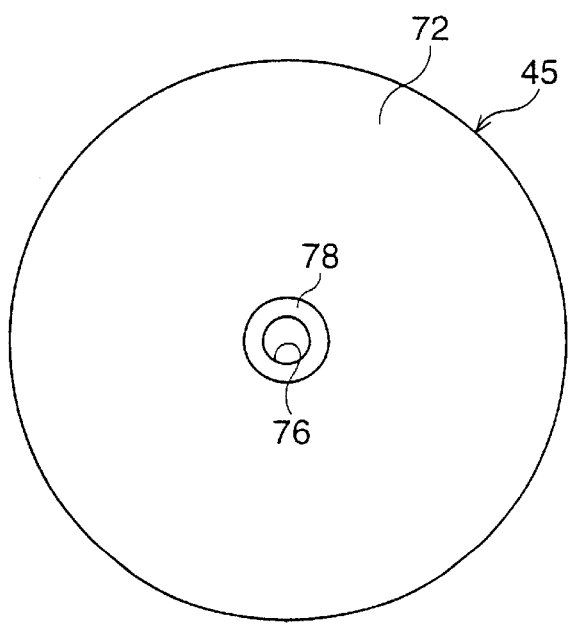
FIG. 4 is a plan view of a non-reflecting member viewed from a bottom side of a second bar.

With reference to FIGS. 3 and 4, the constructions of the assistant point member 35 and the non-reflecting member 45 are described below. FIG. 3 is a sectional view of the target 10, taken in the direction of the arrows substantially along the line IX—IX of FIG. 1. FIG. 4 is a plan view of the non-reflecting member 45, shown from the side of the second bar 14.

A magnet holder 62 is mounted on the top surface 14e of the second bar 14. A magnet 64, which is ring-shaped, is held in the magnet holder 62. The outer diameter of the magnet holder 62 approximately equals the width $L_W$ of the second bar 14. The magnet 64 and the magnet holder 62 are integratedly fixed to the second bar 14 by a screw 66. A reflecting sheet 68 is attached to a head 67 of the screw 66. The assistant point member 35 comprises the magnet holder 62, the magnet 64, the screw 66 and the reflecting sheet 68.

The non-reflecting member 45 comprises a circular plate 72, made of a material through which an electric (radio)

wave transmits for example, resin or rubber material. If the circular plate 72 is made of rubber material, breakage of the circular plate 72 is avoided when the circular plate 72 is accidentally dropped. A non-reflecting sheet 74 is attached to one surface of the circular plate 72. The diameter of the non-reflecting member 45 is approximately seven times the diameter of the head 67 of the screw 66. The thickness of the non-reflecting member 45 is slightly smaller than the thickness of the head 67.

An engagement hole 76 is formed at the center of the non-reflecting member 45. The diameter of the engagement hole 76 approximately equals the diameter of the head 67. An iron ring 78 abuts around the engagement hole 76, at the surface opposite to the surface on which the non-reflecting sheet 74 is attached. The inner diameter of the iron ring 78 approximately equals the diameter of the engagement hole 76, and the outer diameter of the iron ring 78 approximately equals the outer diameter of the magnet holder 62.

The non-reflecting member 45 is attachable to and removable from the assistant point member 35. When the target is utilized for the photogrammetric analytic measurement, the non-reflecting member 45 is mounted on the assistant point member 35 in such a manner that the head 67 of the screw 66 is engaged with the engagement hole 76. In accordance with the engagement of the head 67 and the engagement hole 76, the iron ring 78 is fixedly attached to the magnet holder 62 by magnetic force of the magnet 64, so that the iron ring 78 is securely engaged with the head 67. As is apparent from FIG. 3, when the non-reflecting member 45 is mounted on the assistant point member 35, the reflecting sheet 68 and the non-reflecting sheet 74 lie on a same plane. On the other hand, when the target 10 is not utilized, the non-reflecting member 45 is removed from the assistant point member 35 by a user, by resisting the magnetic attraction between the magnet 64 and the iron ring 78.

Note that, the standard point members 31, 34, 36 and the assistant point members 32, 33 are identical to the assistant point member 35. Further, the non-reflecting members 41, 42, 43, 44 and 46 are identical to the non-reflecting member 45. Namely, each of the non-reflecting members is attachable to or removal from the corresponding standard point member. As each of the non-reflecting members is removable from the corresponding standard point member, the target 10 is handy to carry.

Further, when the target 10 is utilized, the non-reflecting members are respectively mounted on the corresponding standard point members, so that each of the reflecting sheets (68) is surrounded by the non-reflecting sheet (74). Photogrammetric analytic measurement may be performed under a situation in which an amount of luminance is not ideal for photographing, for example, in rain or at nighttime. Also, the measurement may be performed at a spot, in which a surface of a road reflects incident light. However, even if photographing is performed under such adverse conditions, areas of the standard point members 31, 34, 36 and the assistant point members 32, 33, 35 can be viewed clearly in photographed pictures, as each of the reflecting sheets is surrounded by the non-reflecting sheet.

Note that, the ratio between the diameter of the assistant point member 35 and the diameter of the non-reflecting member 45, namely an amount of area of each of the reflecting sheet 68 and the non-reflecting sheet 74, is not restricted to this embodiment. It is just required that the reflecting sheet 68 is large enough for being able to be viewed clearly in photographed pictures. Further, the assistant point member 35 and the non-reflecting member 45 may have any shape other than a circle.

Figure 5:
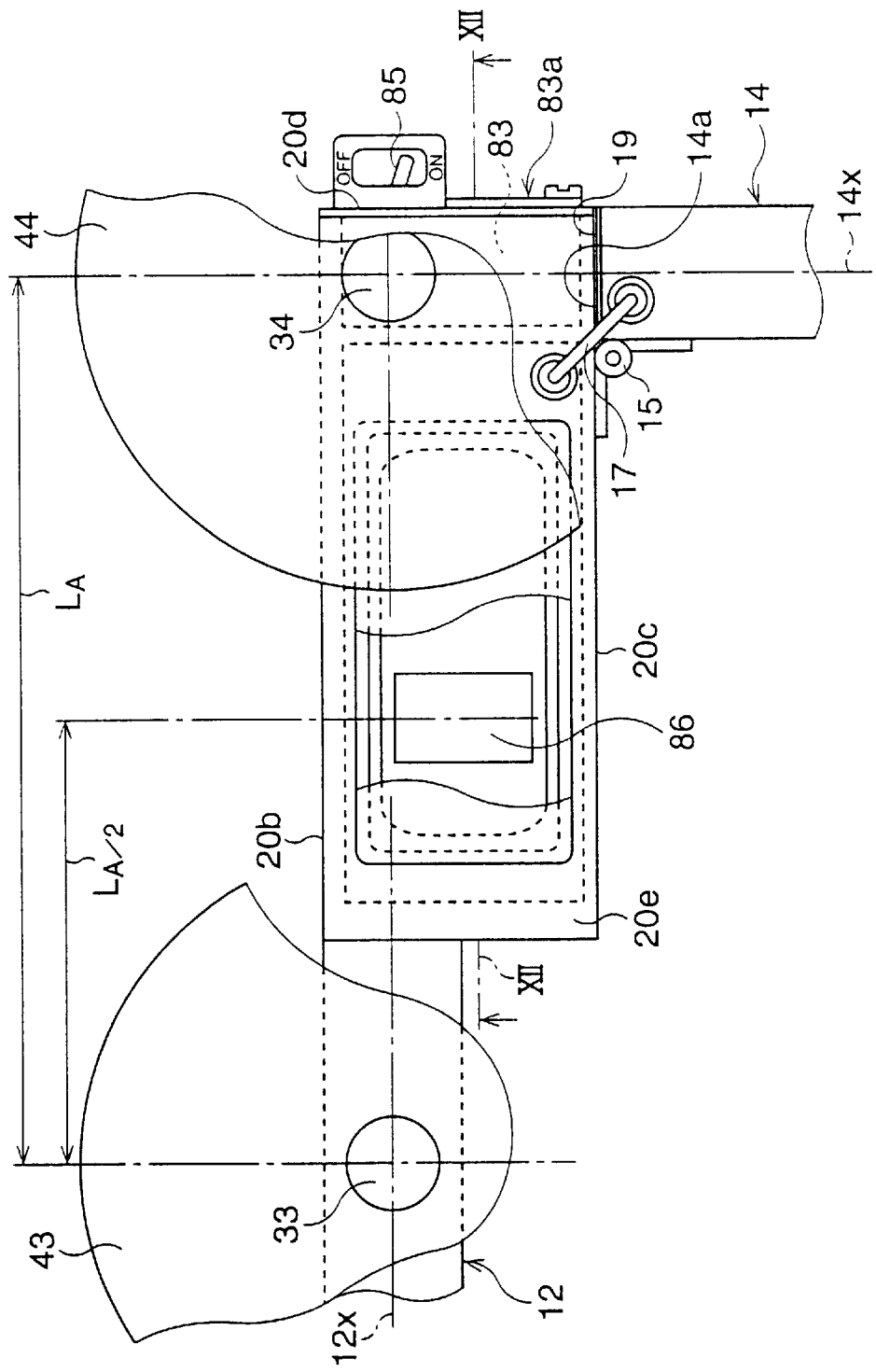
FIG. 5 is an enlarged view of a control unit box of the target.
Figure 6:
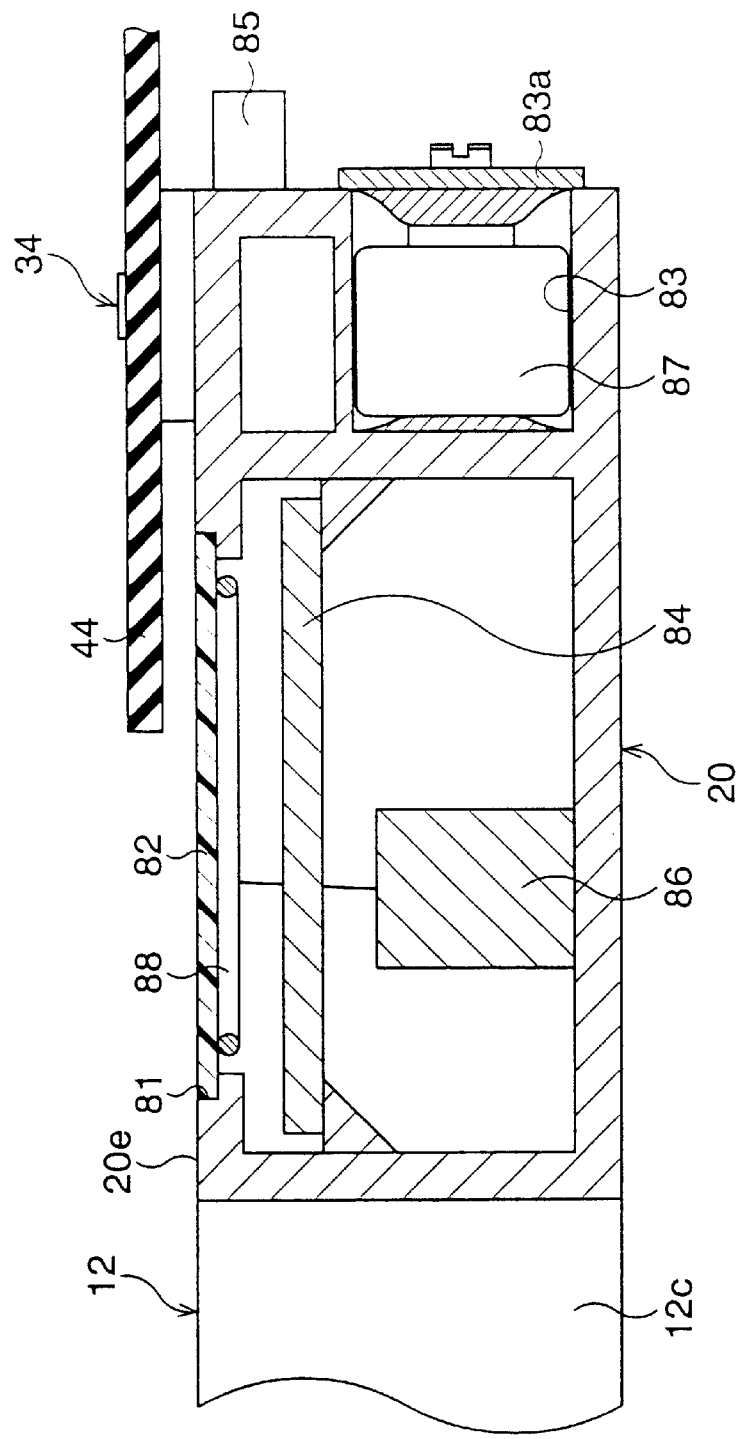
FIG. 6 is a sectional view of the control unit box of FIG. 5.

FIG. 5 shows an enlarged view of the controlling unit box 20 and any other members close to the box 20, with portions broken away for clarity. FIG. 6 is a sectional view of the controlling unit box 20, taken in the direction of the arrows substantially along the line XII—XII of FIG. 5. In FIG. 6, the construction of the controlling unit box 20 is simplified.

The controlling unit box 20 comprises a battery room 83. The battery room 83 is positioned at the side of the side surface 20$d$. A battery 87, which supplies an electric power to the target 10, is installed in the battery room 83. The battery room 83 has an opening in the side of the side surface 20$d$. The opening is closed by a cover 83$a$. A switch 85 is unitarily mounted on the side surface 20$d$. The power supply to the target is stopped and started by manipulation of the switch 85.

An opening 81 is formed in the top surface 20$e$ of the controlling unit box 20. The opening 81 is closed by a cover 82. The cover 82 is made of a material through which an electric wave can transmit, for example, resin material. An antenna 88 is mounted on an inner surface of the cover 82, in such a manner that the antenna 88 is wound along the periphery of the cover 82. In the controlling unit box 20, a control board 84 and an azimuth sensor 86 are mounted. The azimuth sensor 86 and the tilt sensors 52, 54 are connected to the control board 84, whereby the operation of the sensors is controlled by the control board 84.

As is apparent from FIG. 5, the azimuth sensor 86 is placed between the assistant point member 33 and the standard point member 34. Namely, when the distance between the assistant point member 33 and the standard point member 34 is $L_A$, the distance between the center of the azimuth sensor 86 and the assistant point member 33 is $L_A/2$.

The sensing of the azimuth sensor 86 is affected by a magnetic material placed close to the sensor 86, for example, the controlling unit box 20 and the battery 87. Further, as the non-reflecting members 41, 42, 43, 44, 45 and 46 are respectively attached to the members 31, 32, 33, 34, 35 and 36 by magnetic force, by which the sensing of the azimuth sensor 86 may be affected. If the sensing of the azimuth sensor 86 is affected by the magnetic force, it is necessary to compensate azimuth data sensed by the azimuth sensor 86. However, as described above, the azimuth sensor 86 is intermediately placed between the assistant point member 33 and the standard point member 34. Namely, at the portion where the sensor 86 is placed, an influence of the magnetic force generated around the assistant point member 33 and the standard point member 34 is at a minimum. Accordingly, the sensing of the azimuth sensor 86 is not significantly affected.

When the switch 85 is turned ON to start the power supply, the sensors 52 and 54 measure the tilt angles and the azimuth sensor measures the azimuth at regular intervals in accordance with a control pulse output from the control board 84. Data measured by the sensors 52, 54 and 86 is output to the control board 84. After the data is subjected to predetermined operations, for example, compensation, in the control board 84, the data is transmitted to a receiver from the antenna 86 by wireless. The receiver is mounted on an external device, for example, a digital camera (not shown).

As described above, the antenna 88 is placed on the inner surface of the cover 82. As the cover 82, the non-reflecting member 43, 44 are made of the material through which an electric wave can transmit, the electric wave output from the antenna 88 is transmitted to the receiver, without being interrupted by the cover 82 and the non-reflecting member 43, 44.

As described above, if the receiver is mounted in a digital camera, the tilt angle data, the azimuth and image data photographed by the digital camera are saved to a recording medium. By inputting such data to a computer from the recording medium, processing of the image data can be performed in the computer more rapidly, so that a survey map can be made more accurately.

A spot of the photogrammetric analytic measurement, with the target 10 placed at a predetermined position on the spot, is photographed by a camera.

Figure 7:
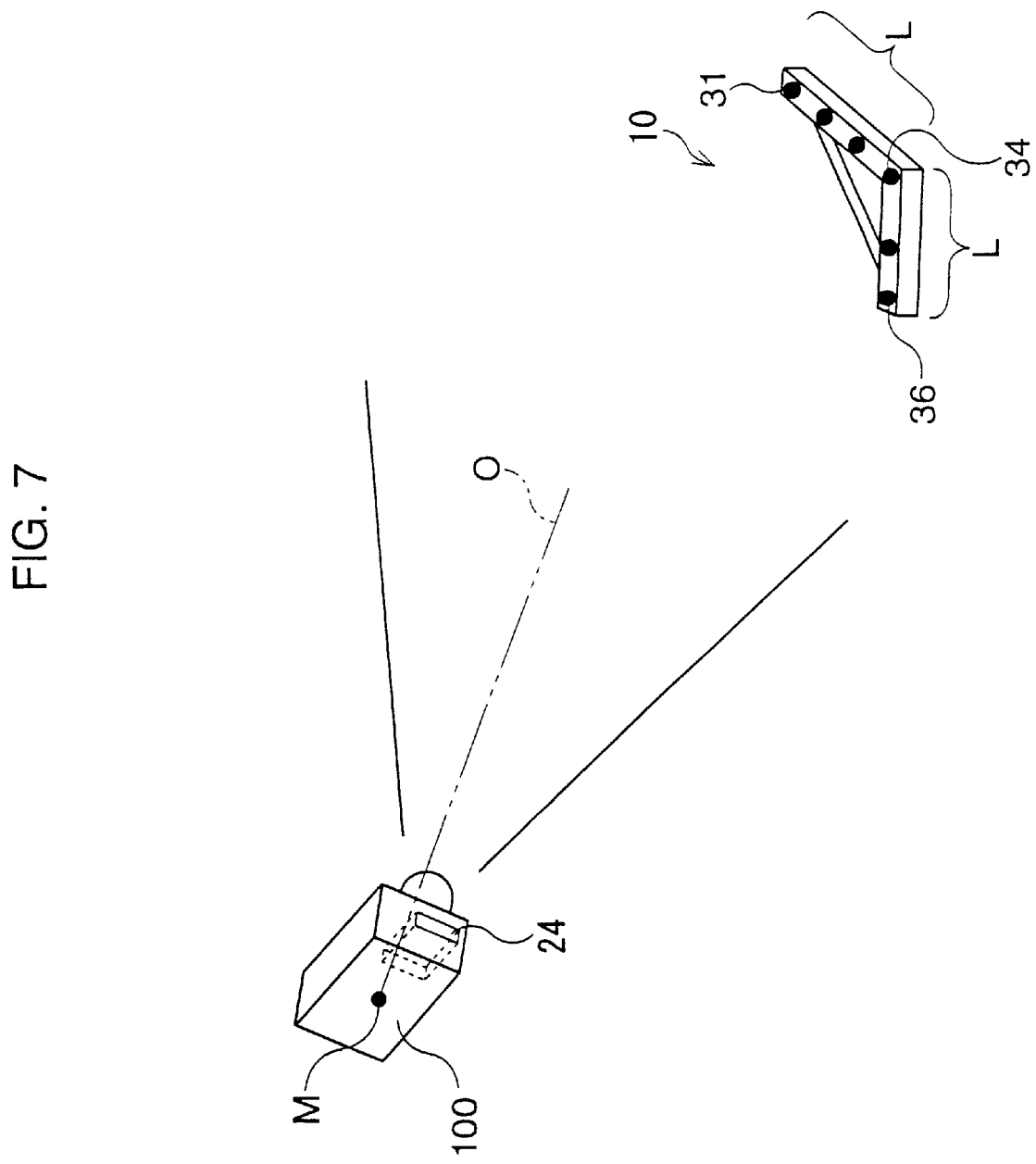
FIG. 7 is a conceptual view of a positional relationship between the target and a camera.

A procedure for calculating positional data of a camera using the target 10 in this embodiment will now be explained. FIG. 7 shows a positional relationship between the target 10 and a camera 100. The target 10 is photographed by the camera 100 at a camera position M. The camera position M is defined as a back principal point of a photographing lens system of the camera 100. An optical axis of the photographing lens system is represented by a broken line 0. As described above, the target 10 is provided with the three standard point members and the three assistant point members thereon. However, only the three standard point members are used for clarity of explanation. In FIG. 7, a plane, defined by the standard point members 31, 34 and 36, is the standard plane. The length of the distance between the standard point members 31, 34, and the length of the distance between the standard point members 34, 36 are the standard length L.

Note that, as is apparent from FIG. 7, an IC card 24, a readable recording medium, is mounted in the camera 100. The IC card 24 is removable from the camera 100, and attachable to other devices. Image data of the photographed pictures is recorded in the IC card 24. When the photogrammetric analytic measurement is performed, the image data recorded in the IC card 24 is loaded in a memory of the device of the photogrammetric analytic measurement as described below, after mounting the IC card . 24 in the device of the photogrammetric analytic measurement.

Figure 8:
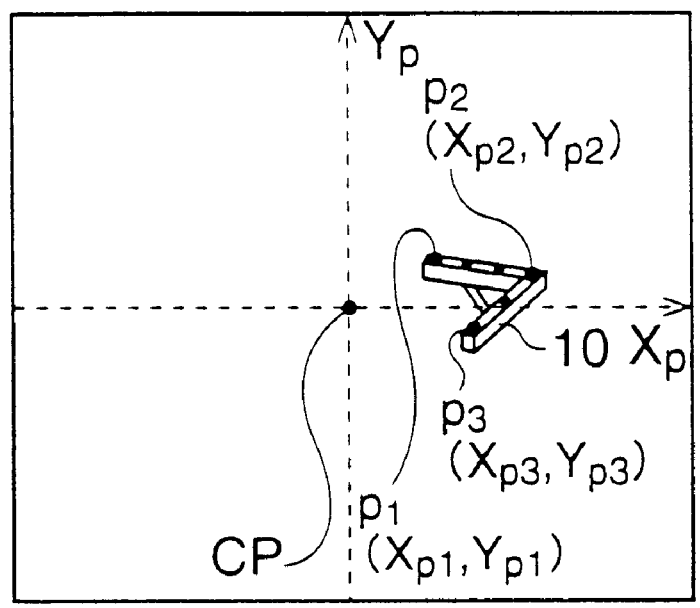
FIG. 8 is a photographed image photographed by the camera.

FIG. 8 shows a photographed image at the camera position M. A two-dimensional coordinate system (Xp, Yp) is set in the photographed image. An origin of the two-dimensional coordinate system is a photographing center point CP. As apparent from FIG. 2, in the photographed image, image points of the standard point members 31, 34 and 36 respectively correspond to two-dimensional coordinates P1($Xp_1$, $Yp_1$), P2($Xp_2$, $Yp_2$) and P3($Xp_3$, $Yp_3$). Note that, the two-dimensional coordinate system of the photographed image is referred to as a "photograph coordinate system".

Figure 9:
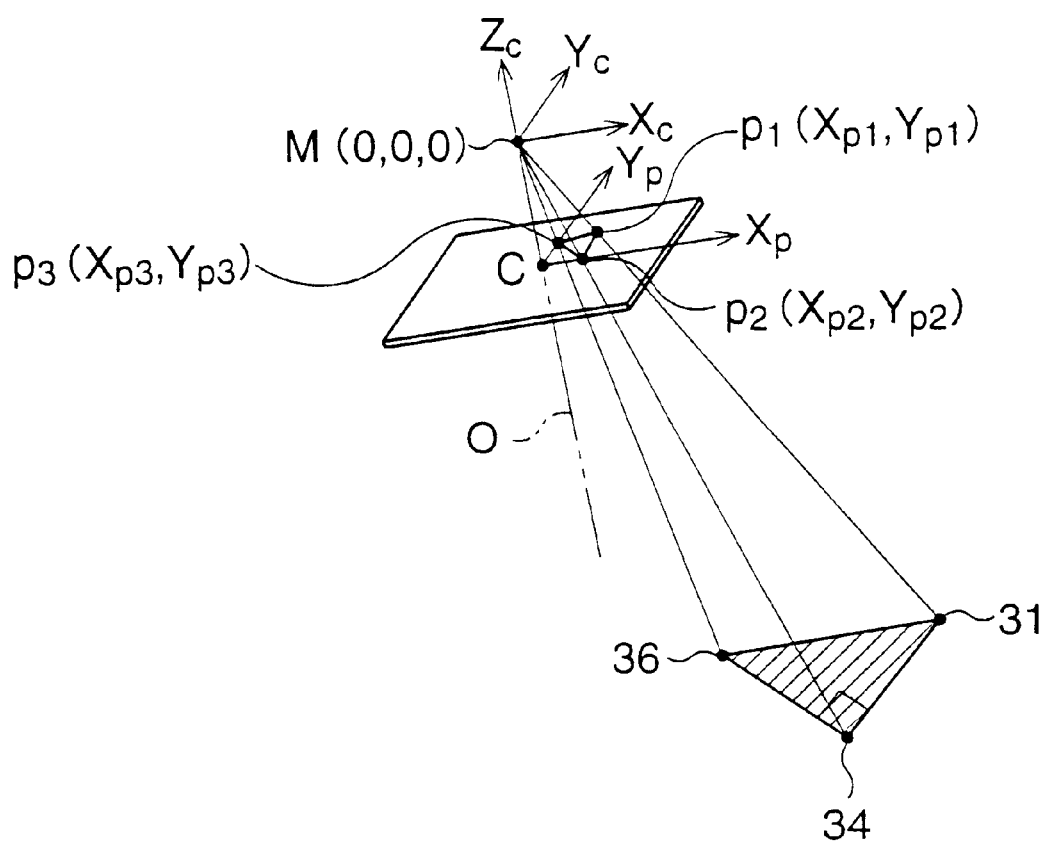
FIG. 9 is a conceptual view of a positional relationship between the photographed image and the target.

FIG. 9 shows a positional relationship between the photographed image photographed by the camera 100 and the target 10. A hatched area is the standard plane defined by the standard point members 31, 34 and 36. In FIG. 9, a three-dimensional coordinate system of the camera position M is shown as (Xc, Yc, Zc). An origin of the three-dimensional coordinate system corresponds to the back principal point of the photographing lens system of the camera 100. Further, the Zc-axis corresponds to the optical axis 0 of the photographing lens system at the camera position M. The Xc-axis is parallel to the Xp axis of the two-dimensional coordinate system of the photographed image shown in FIG. 8, and the Yc-axis is parallel to the Yp axis of the two-dimensional coordinate system. In this specification, the three-dimensional coordinate system at the camera position M is referred to as a "camera coordinate system".

A three-dimensional coordinate system (Xs, Ys, Zs) shown in FIG. 10, which is a right-handed coordinate system, is set in order to determine the camera position M based on the photographed image. An origin of the three-dimensional coordinate system (Xs, Ys, Zs) is accorded to the standard point member 34 of the target 10. A Zs-axis is a direction from the standard point member 34 to the standard point member 36. An Xs-axis is perpendicular to the Zs-axis, lying on the standard plane. A Ys-axis is an axis on which the standard point member 34 lies, being perpendicular to the standard plane, namely being perpendicular to the sheet of drawing. As described above, the length of the distance between the standard point members 31, 34 and the length of the distance between the standard point members 34, 36 are L. Accordingly, image points of the standard point members 31, 34 and 36 respectively correspond to three-dimensional coordinates Ps1(−L, 0, 0), Ps2(0, 0, 0) and Ps3(0, 0, L). In this specification, the three-dimensional coordinate system of FIG. 10 is referred to as a "scene coordinate system".

The camera position M is defined by a relationship between the scene coordinate system and the camera coordinate system. Namely, the camera position M is defined by a relationship of a movement distance of the origin of the camera coordinate system from the origin of the scene coordinate system to, a rotational angle of the Xs-axis around the Xc-axis, a rotational angle of the Ys-axis around the Yc-axis and a rotational angle of the Zs-axis around the Zc-axis.

A relationship between Psi(Psxi, Psyi, Pszi) (i=1, 2, 3) in the scene coordinate system and Pci(Pcxi, Pcyi, Pczi) (i=1, 2, 3) in the camera coordinate system is stated in an equation (1) as below.

$$Pci = R(Psi - \Delta):  \quad (1)$$

$$Pci = \begin{pmatrix} Pcxi \\ Pcyi \\ Pczi \end{pmatrix}; \quad Psi = \begin{pmatrix} Psxi \\ Psyi \\ Pszi \end{pmatrix};$$

$$R = \begin{pmatrix} Cos\beta Cos\gamma & Cos\alpha Sin\gamma + Sin\alpha Sin\beta Cos\gamma & Sin\alpha Sin\gamma - Cos\alpha Sin\beta Cos\gamma \\ -Cos\beta Cos\gamma & -Cos\alpha Cos\gamma - Sin\alpha Sin\beta Sin\gamma & Sin\alpha Cos\gamma + Cos\alpha Sin\beta Sin\gamma \\ Sin\beta & -Sin\alpha Cos\beta & Cos\alpha Cos\beta \end{pmatrix};$$

$$\Delta = \begin{pmatrix} \Delta X \\ \Delta Y \\ \Delta Z \end{pmatrix} \quad (i = 1, 2, 3)$$

In the equation (1), α is the rotational angle of the Xs-axis around the Xc-axis, β is the rotational angle of the Ys-axis around the Yc-axis, γ is the rotational angle of the Zs-axis around the Zc-axis. Further, R is a rotational matrix of α, β and γ, and Δ is a vector from the scene coordinate system to the camera coordinate system.

A relationship between Pci(Pcxi, Pcyi, Pczi) and Di(Dxi, Dyi) (i=1, 2, 3) is stated in an equation (2) as below. Note that, Pci is the three-dimensional coordinates of the standard point Pi in the camera coordinate system, and Di is the two-dimensional coordinates of the standard point in the photograph coordinate system. Futher, in the equation (2), "If" is a focal distance of the photographing lens system of the camera 10.

$$\left.\begin{array}{l} Dxi = f \cdot Pcxi/Pczi \\ Dyi = f \cdot Pcyi/Pczi \end{array}\right\} \quad (2)$$

$$(i = 1, 2, 3)$$

As described above, the two-dimensional coordinates of each of the standard points in the photograph coordinate are calculated from the three-dimensional coordinates in the scene coordinate system based on the equations (1) and (2). On the other hand, the two-dimensional coordinates of each of the standard points are automatically extracted from the photographed image. Accordingly, with respect to the standard points, by comparing the values of the two-dimensional coordinates calculated from the equations (1) and (2) with the values of the two-dimensional coordinates extracted from the photographed image, the values defining the camera position, namely ΔX, 66 Y, ΔZ, α, β and γ can be calculated.

Figure 17:
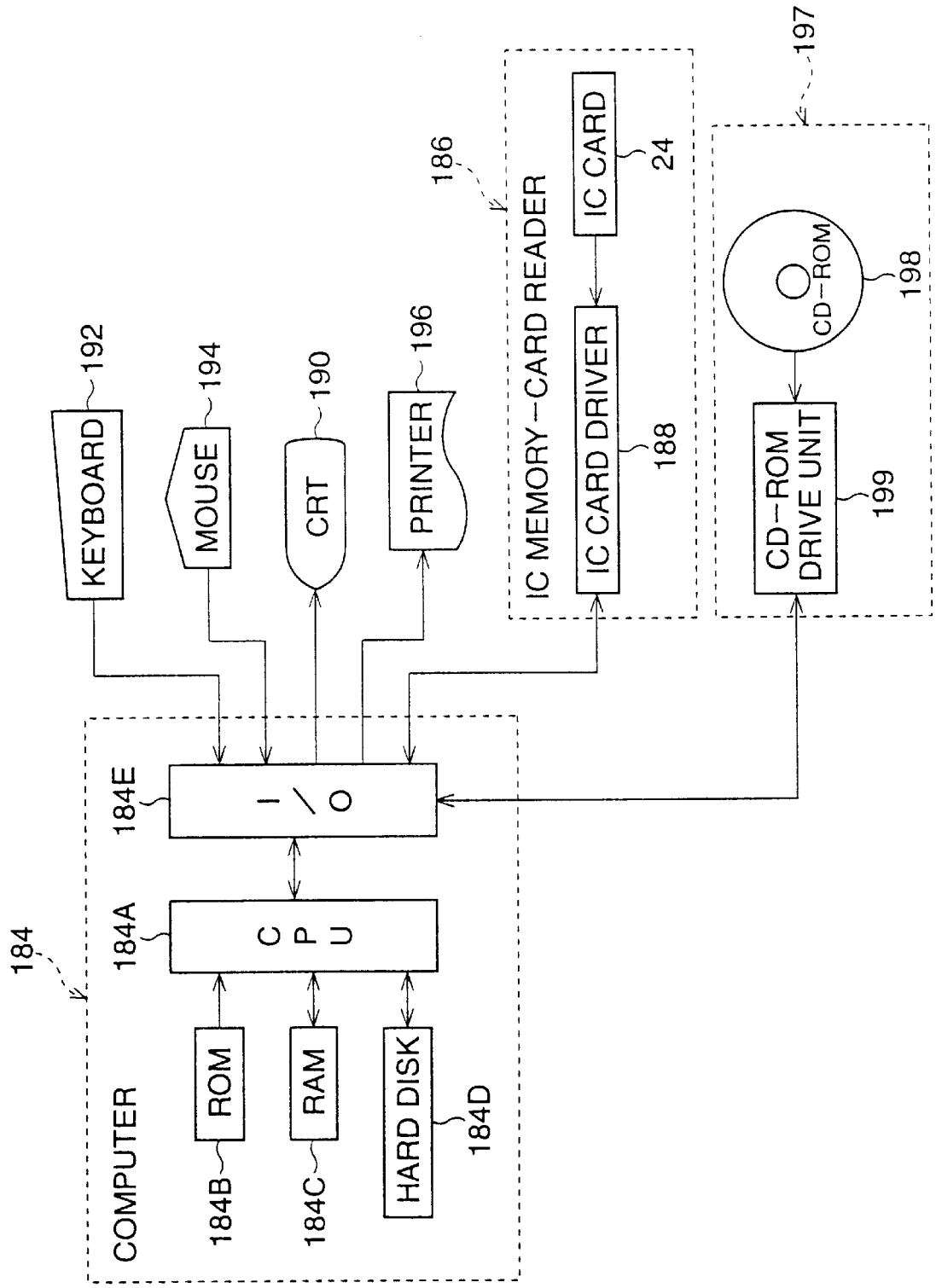
FIG. 17 is a block diagram of a coordinate-calculator system, in which a photogrammetric analytic measurement is performed, according to the present invention.

FIG. 17 shows a block diagram of a coordinate-calculator system, in which the photogrammetric analytic measurement, as mentioned above, is performed on the basis of the digital image data stored in the IC card 24.

As shown in FIG. 17, the coordinate-calculator system is constructed as a computer system comprising a computer 184, which includes: a central processing unit (CPU) 184A; a read-only-memory (ROM) 184B having an operating system program, constants, etc. stored therein; a random-access-memory (RAM) 184C for storing temporary data, temporary constants, etc.; a hard disk 184D for storing data resulting from calculations executed by the CPU 184A; and an input/output interface (I/O) 184E.

The computer system also comprises an IC memory card reader 186 connected to the computer 184, via the I/O 184E. The IC memory-card reader 186 is provided with a slot for receiving the IC memory card 24, and includes an IC card driver 188 for reading a given frame of digital image data and other information data.

The computer system also comprises a CD-ROM reader 197 connected to the computer 184, via the I/O 184E. The CD-ROM reader 197 is provided with a tray for receiving a CD-ROM 198, and includes a CD-ROM driver unit 199. A calculating program of the standard points of the target and positional data of the camera, as described below, is stored in the CD-ROM 198. The calculating program is read from the CD-ROM 198, and installed to the hard disk 184D.

The computer system further comprises a monitor 190 for reproducing a photographed picture based on the frame of digital image data read from the IC memory card 24 and a survey map produced by the computer 184, a keyboard 192 for inputting various command signals and various data to the computer 184, a mouse 194 for manipulating a cursor displayed on the monitor 190, and a printer 196 for printing the survey map on a sheet of paper, if necessary.

Figure 11:
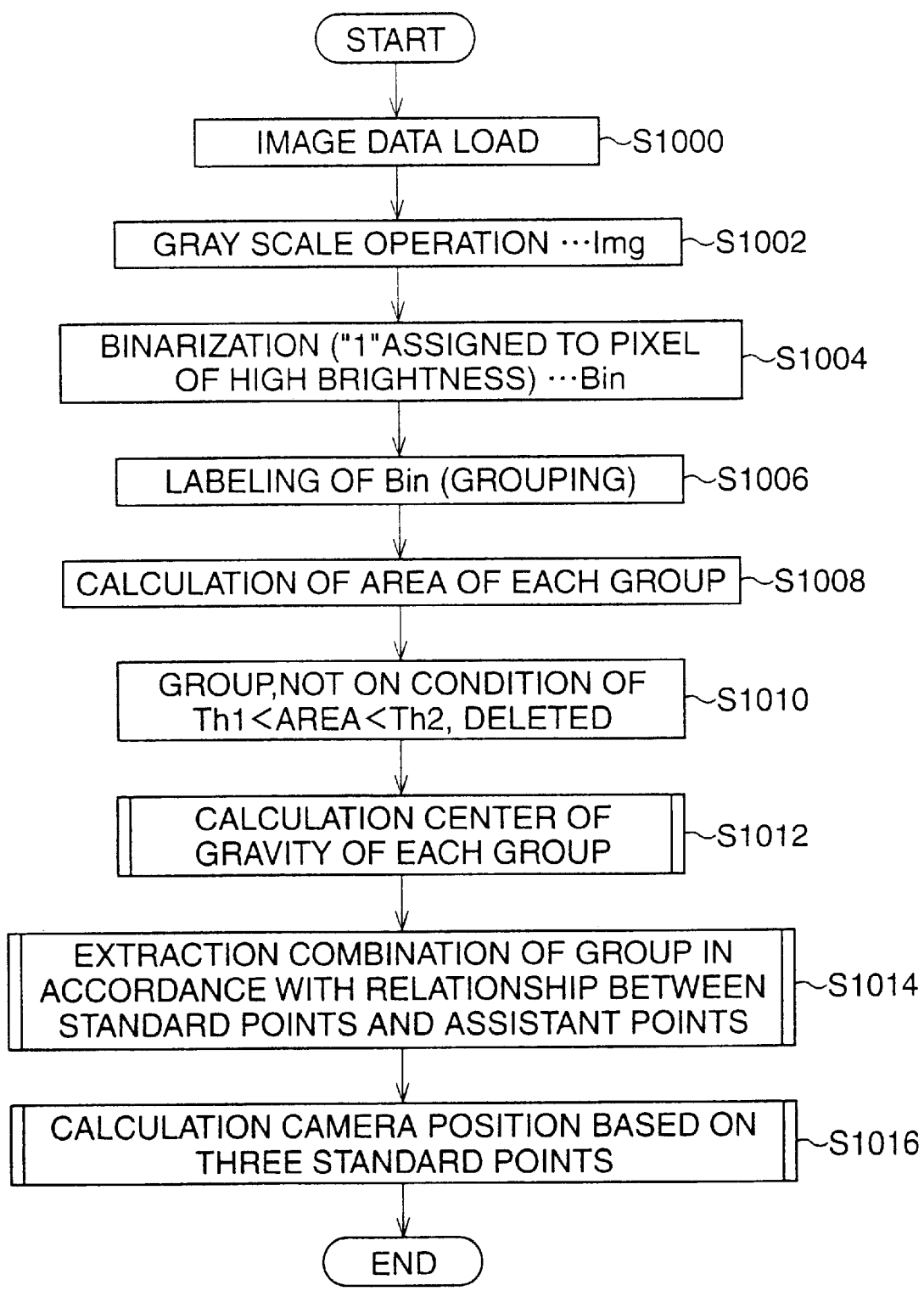
FIG. 11 is a flowchart indicating a process of calculating a position of a camera.

FIG. 11 shows a flowchart indicating a process of the calculating program of the camera position, according to this embodiment, executed by the CPU 184A.

After the target 10 is situated on a predetermined position in a spot for photogrammetric analytic measurement, the spot is photographed by the camera 100. In step S1000, digital image data of the spot is loaded to a system controller of a photogrammetric analytic measurement device to which this embodiment is applied.

In step S1002, a gray scale operation is performed. By the gray scale operation, brightness information is calculated based on color information of one frame color image data. After the brightness information, which is represented by 256 intensity levels, with respect to each pixel composing the digital image data, the brightness information is stored to a variable Img of array type. Namely, the brightness information of each pixel is represented by Img (j, k). Note that, "j" and "k" correspond to the values of the two-dimensional coordinates (the photograph coordinate system) of each pixel in the digital image data.

In step S1004, binarization of the brightness information of each pixel is performed. In this embodiment, the binarization is performed using thresholding. The brightness information stored in the variable Img is compared with a predetermined threshold. If the brightness information is higher than the predetermined threshold, "1" is stored to a variable Bin of array type. If the brightness information is not higher than the predetermined threshold, "1" is stored to the variable Bin. Namely, binary information of the brightness information of each pixel is represented by Bin (j, k).

As described above, the reflecting sheet is attached on the standard point members 31, 34, 36 and the assistant point members 32, 33, 35. The standard point members 31, 34 and 36 are respectively surrounded by the non-reflecting members 41, 44 and 46 which are black. Likewise, the assistant point members 32, 33, 35 are respectively surrounded by the non-reflecting members 42, 43 and 45 which are black. Accordingly, the binary information of pixels corresponding to the standard point members 31, 34, 36 and the assistant point members 32, 33, 35 is represented by "1", and the binary information of pixels corresponding to the non-reflecting members 41, 42, 43, 44, 45, 46 is represented by "1".

Then, in step S1006, labeling is performed. By the labeling, a set of pixels, binary information of which are "1", is extracted as a group. Namely, regions, brightness information of which are high, are extracted from the digital image data.

In step S1008, an area of each group is calculated. Namely, with respect to each group, a number of pixels composing the group is calculated. The number of pixels of each group and two-dimensional coordinates corresponding to the pixels are stored to predetermined variables.

Then, in step S1010, it is judged based on the number of pixels of each group if each group corresponds to the standard point members or the assistant point members. It is checked that the number of the pixels is between a greatest lower bound Th1 and a least upper bound Th2. The values of Th1 and Th2 are determined, such that a range of the pixel numbers defined by Th1 and Th2 is able to contain the pixel number of the group corresponding to the standard point members and the assistant point members, with the range being as minimal as possible.

Accordingly, a group corresponding to noise of the digital image, a pixel number of which is one or two, and a group corresponding to a wide region of high brightness, for example, a painted region of bright color on a road of the spot, are deleted.

Figure 12:
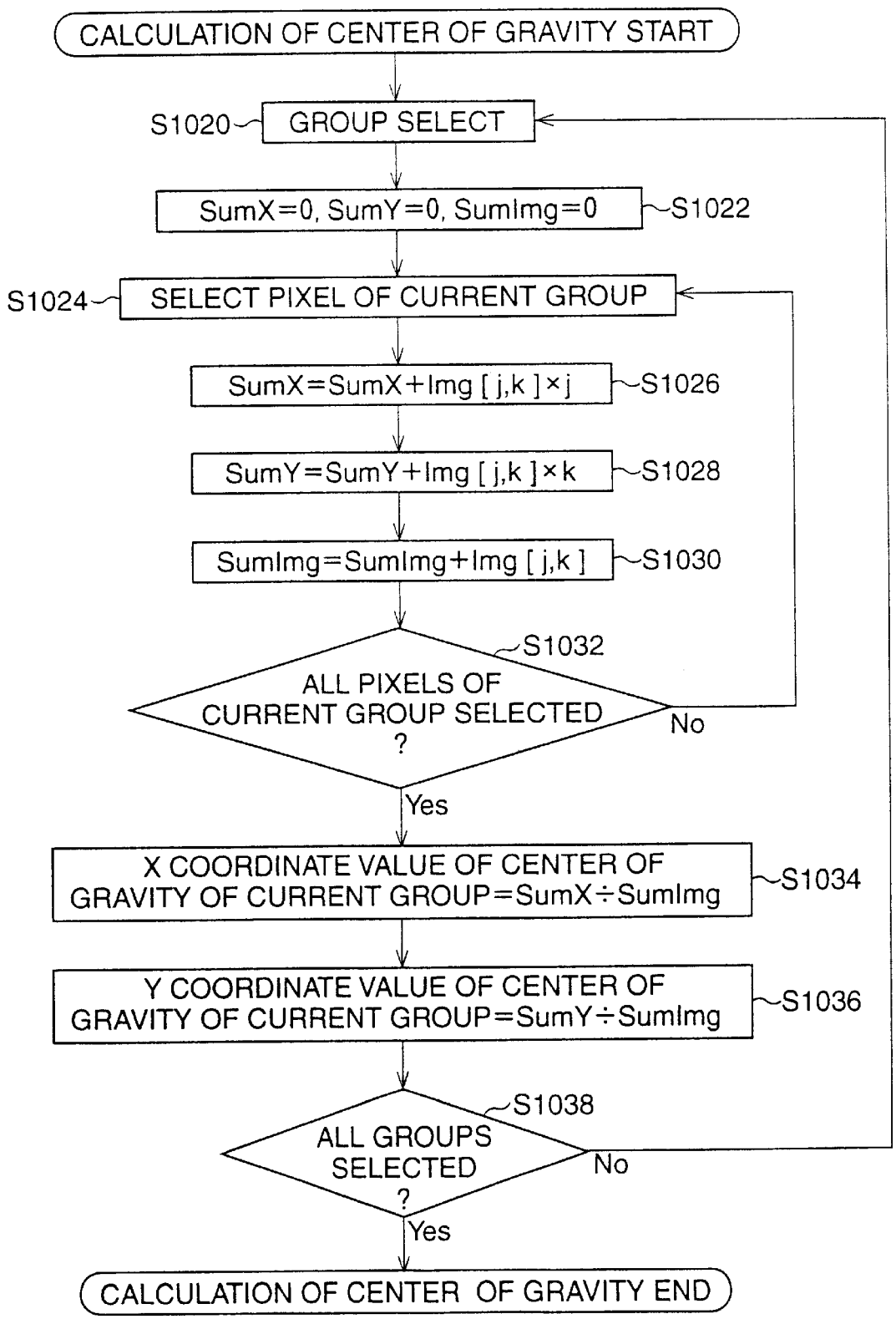
FIG. 12 is a flowchart of procedure of calculating a center of gravity of a group.

In step S1012, a center of gravity of each group is calculated based on the brightness information of each group. FIG. 12 shows a flowchart of a routine for calculating the center of gravity. In step S1020, one group is selected. In step S1022, variables SumX, SumY and SumImg are initialized. A continued product of the brightness information of each pixel composing the selected group and an X component of the two-dimensional coordinate of the each pixel is stored to the SumX. A continued product of the brightness information of each pixel composing the group and a Y component of the two-dimensional coordinate of the each pixel is stored to the SumY. A sum total of the brightness information of each pixel composing the group is stored to the SumImg.

In step S1026, with respect to one pixel composing the group, a product of the brightness information (Img (j, k)) and the X component (j) is calculated to be stored to the SumX after being added to a current value stored in the SumX. Then, in step S1028, with respect to the same pixel composing the group, a product of the brightness information (Img (j, k)) and the Y component (k) is calculated to be stored to the SumY after being added to a current value stored in the SumY. In step S1030, the brightness information of the same pixel is added to a current value stored in the SumImg to be stored to the SumImg. The above mentioned processes from step S1026 through step S1030 are performed repeatedly, with respect to each pixel composing the group.

Namely, a sum total of weighted brightness information based on X component of each pixel composing the group is stored in the SumX, and a sum total of weighted brightness information based on Y component of each pixel composing the group is stored in the SumY. As described above, the sum total of the brightness information of the pixels of the group is stored in the SumImg.

In step S1032, it is checked if all pixels composing the group have been subjected to the above mentioned procedures. If the above mentioned procedures have been performed with respect to all pixels composing the group, the process goes to step S1034. In step S1034, an X component of the center of gravity is calculated by dividing the sum total of weighted brightness information based on X component of each pixel by the sum total of the brightness information of each pixel. In step S1036, a Y component of the center of gravity is calculated by dividing the sum total of weighted brightness information based on Y component of each pixel by the sum total of the brightness information of each pixel.

Then, in step S1038, it is checked if all groups in the digital image data have been subjected to the calculation of the center of gravity. If there are any groups which have not been subjected to the calculation, the procedures from step S1020 through step S1036 are repeatedly performed. If all groups have been subjected to the calculation of the center of gravity, the process goes to step S1014 of FIG. 11.

Figure 13:
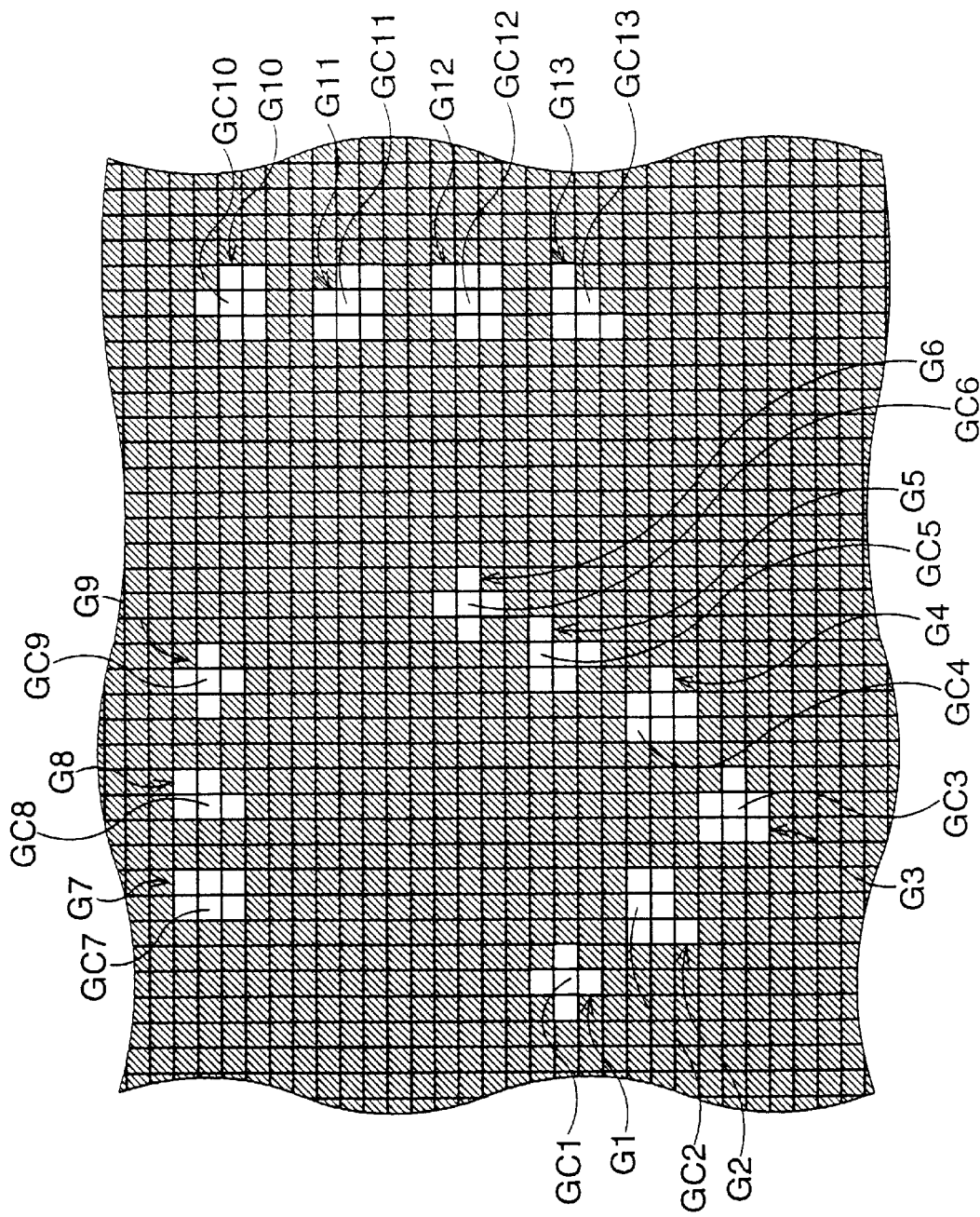
FIG. 13 is a conceptual view of each pixel of a digital image data of the photographed image.

FIG. 13 is a conceptual view of each pixel of the digital image data after the calculation of the center of gravity. In FIG. 13, pixels of low brightness information are hatched by oblique lines. As is apparent from FIG. 13, groups from G1 through G13 have been extracted. The centers of gravity of the groups are respectively represented by GC1 through GC13.

Figure 14:
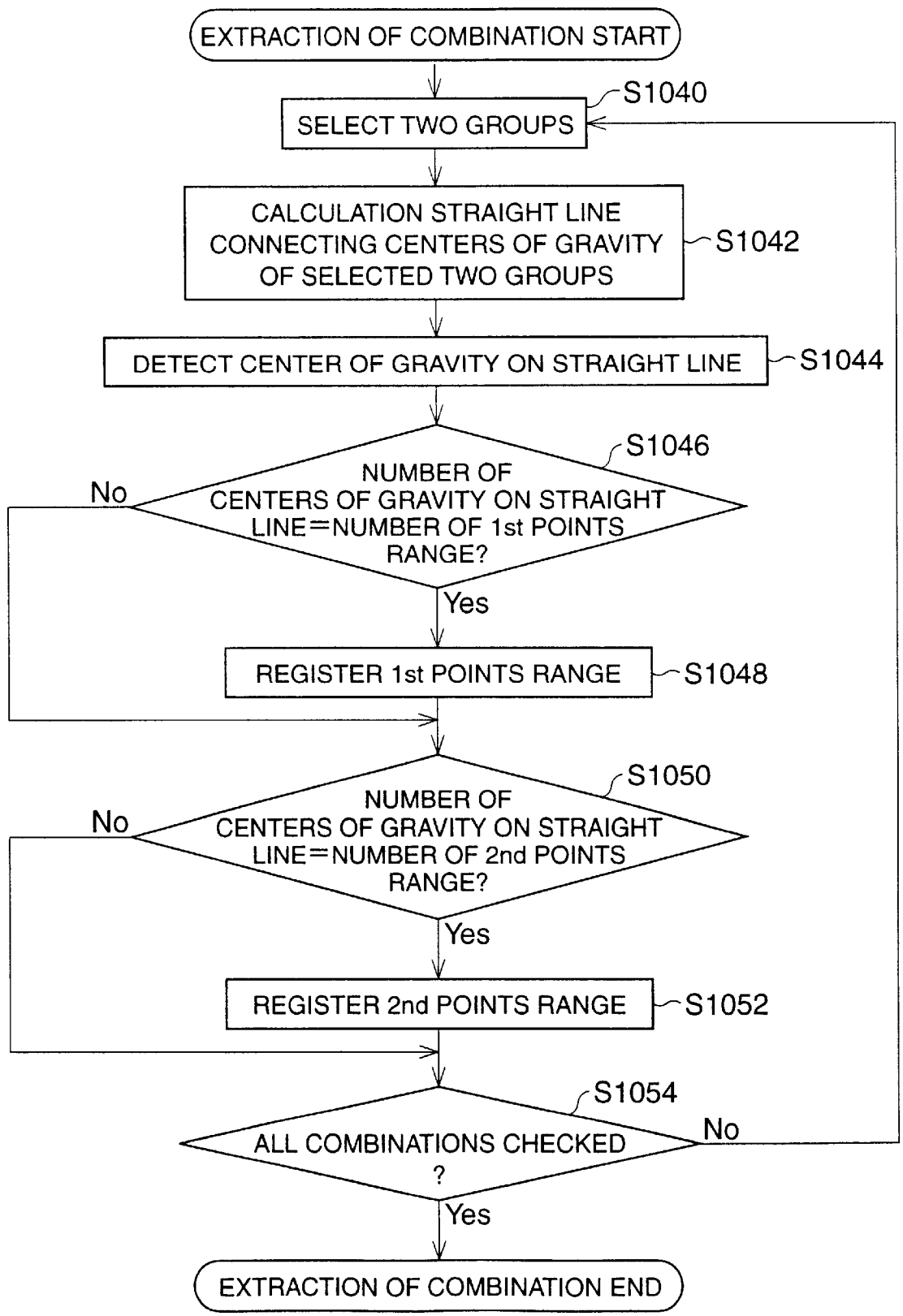
FIG. 14 is a first half of a flowchart of procedures of extraction combinations of the groups.
Figure 15:
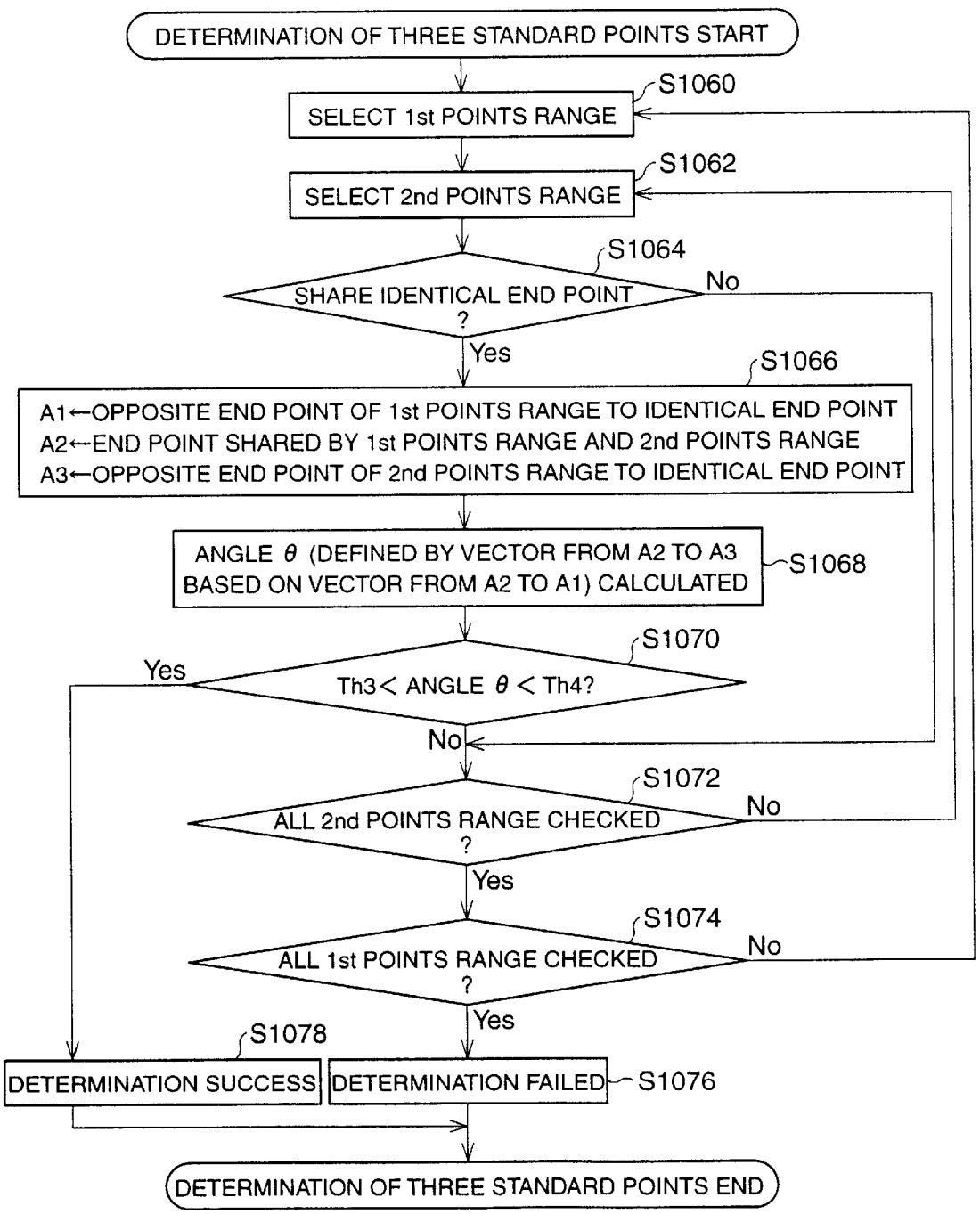
FIG. 15 is shows the latter half of the flowchart of the procedures of extraction combinations of the groups.

In step S1014, combinations of the groups, which satisfy a positional relationship between the standard position members 31, 34, 36 and the assistant position members 32, 33, 35 of the target 10, are extracted. FIG. 14 shows the first half of a flowchart of an extraction routine of the combinations of the groups. FIG. 15 shows the latter half of the flowchart. The procedures of the flowchart will be explained with reference to FIG. 13.

As described above, in the target 10, the standard point members 31, 34 and the assistant point members 32, 33 are provided on the straight line (a first straight line) connecting the standard point members 31 and 34, and the standard point members 34, 36 and the assistant point member 35 are provided on the straight line (a second straight line) connecting the standard point members 34 and 36. Namely, the target 10 is identified in the photographed picture by a combination of a four points range comprising four points and a three points range comprising three points, the four points range and the three points range defining a predetermined angle. Accordingly, one of the four points range and the three points range is treated as a first points range, and another of them is treated as a second points range, in the processes of the flowcharts of FIGS. 14 and 15.

In step S1040, two groups are optionally selected. In step S1042, a straight line, which lies on the centers of gravity of the selected two groups, is calculated. Then, in step S1044, groups which have a center of gravity between the centers of gravity of the selected two groups, lying on the straight line, are detected.

In step S1046, it is checked if a number of the groups detected in step S1044 equals the number of the first points range. If a number of groups, centers of gravity of which are on the straight line, including the selected two groups in step S1040, equals the number of points composing the first points range, the process goes to step S1048. Otherwise, the process goes to step S1050, in which it is checked if the number of groups detected in step S1044 equals the number of points composing the second points range.

For example, a case, in which four points range is treated as the first points range and three points range is treated as the second points range, will be explained now. If the groups G1 and G2 are selected, there are no centers of gravity of other groups lying on a straight line between the GC1 and the GC2. Accordingly, the process goes to step S1054.

If the groups G3 and G6 are selected in step S1040, two centers of gravity, GC4 of the group G4 and GC5 of the group G5, exist on a straight line between the centers of gravity GC3 and GC6. Accordingly, the process goes to step S1048. Likewise, if the groups G10 and G13 are selected in step S1040, the process goes to step S1048, as two centers of gravity, GC11 of the group G11 and GC12 of the group G12, exist on a straight line between the centers of gravity GC10 and GC13.

If the groups G1 and G3 are selected in step S1040, there is one center of gravity GC2 of the group G2 on a straight line between the centers of gravity GC1 and GC3. Accordingly, the process goes to step S1052. Likewise, if the groups G7 and G9 are selected in step S1040, the process goes to step S1052 as there is one center of gravity GC8 of the group G8 on a straight line between the centers of gravity GC7 and GC9.

In step S1048, a plurality of groups number of which equals the number of groups of the first points range, is registered as the first points range which lie on a same straight line. In step S1052, a plurality of groups number of which equals the number of groups of the second points range, is registered as the second points range which lie on a same straight line. For example, in the case in which the four points range is treated as the first points range and the three points range is treated as the second points range, a set of the groups G4, G5, G6, G7 and a set of the groups G10, G11, G12, G13 are respectively registered as the first points ranges, and a set of the groups G1, G2, G3 and a set of the groups G6, G7, G8 are respectively registered as the second points ranges.

In step S1054, it is checked if all combinations of two groups in the digital image data have been subjected to the procedures from step S1040 through step S1052. If there are some combinations of two groups which have not been subjected to the procedures, the process returns to step S1040 and the procedures from step S1040 through step S1052 are repeatedly performed. If there is no combination of two groups which have not been subjected to the procedures, the process goes to step S1060 of the flowchart of FIG. 15. This process may be considered to be somewhat flexible. That is, the process for detection of gravity on a straight line between the centers of gravity of the two selected groups should be considered to detect centers of gravity substantially on the straight line.

One of the registered first points ranges is optionally selected in step S1060, and one of the registered second points ranges is optionally selected in step S1062. Then, in step S1064, it is checked if a center of gravity of a group corresponding to an end point of the selected first points range and a center of gravity of a group corresponding to an end point of the selected second points range are in accord. If the centers of gravity of the groups corresponding to the end points of the selected first and second points range are not in accord, the process goes to step S1072.

In step S1072, it is checked if all of the registered second points ranges have been selected. If there are any registered second points ranges which have not been selected in step S1062, the process returns to step S1062. Then, after another registered second points range is newly selected in step S1062, it is checked in step S1064 if a combination of the already selected first points range and the newly selected second points range meets the condition of step S1064. The procedures of steps S1062, S1064 and S1072 are repeatedly performed, until a combination of the first and second points ranges, which meets the condition of step S1064, is selected.

If there is no combination of the first and second points ranges which meets the condition of step S1064 after if all second points range have been selected, the process goes to step S1074. Then, in step S1074, it is checked if all of the registered first points range have been selected. If there are any registered first points ranges which have not been selected in step S1060, the process returns to step S1060. Then, after another registered first points range is newly selected in step S1060, the above procedures from step S1062 are repeatedly performed.

Namely, until the combination of the first and second points ranges, which meets the condition of step S1064, is selected, step S1064 is repeatedly performed with respect to all of the first and second points ranges in the digital data of the photographed image, each time changing a combination of the first and the second points ranges. In FIG. 13, the group G3 is an end point of the registered second points range composed by the groups G1, G2, G3, and also an end point of the registered first points range composed by the groups G3, G4, G5, G6. Accordingly, in the case in which the four points range is treated as the first points range and the three points range is treated as the second points range, the set of the groups G3, G4, G5, G6 and the set of the groups G1, G2, G3 are extracted as the combination of the first and second points ranges, which share an identical end point.

In step S1064, two-dimensional coordinates of a center of gravity of the group corresponding to another end point, of the registered first points range, opposite to the end point which accords with the end point of the registered second points range, are stored to a variable A1 $(Ax_1, Ay_1)$. The variable A1 represents two-dimensional coordinates of the standard point member 31. Also, two-dimensional coordinates of the center of gravity of the group corresponding to the end point shared by the registered first points range and the registered second points range are stored to a variable A2 $(Ax_2, Ay_2)$. The variable A2 represents two-dimensional coordinates of the standard point member 34. Further, two-dimensional coordinates of a center of gravity of the group corresponding to another end point, of the registered second points range, opposite to the end point which accords with the end point of the registered first points range, are stored to a variable A3 $(Ax_3, Ay_3)$. The variable A3 represents two-dimensional coordinates of the standard point member 36.

Namely, in the case in which the four points range is treated as the first points range and the three points range is treated as the second points range, two-dimensional coordinates of the center of gravity GC6 are stored to the variable A1, two-dimensional coordinates of the center of gravity GC3 are stored to the variable A2, and two-dimensional coordinates of the center of gravity GC1 are stored to the variable A3.

In step S1068, an angle $\theta$, by which a vector from the variable A2 to the variable A3 is rotated in the counterclockwise direction from a vector from the variable A2 to the variable A1, is calculated. Then, it is checked in step S1070 that the angle $\theta$ is larger than a greatest lower bound Th3, and is smaller than a least upper bound Th4. Note that, in this embodiment, 0 degrees is set to the greatest lower bound Th3, and 180 degrees is set to the least upper bound Th4, as the angle defined by the first and second bars 13, 14 is 90 degrees and the spot is never photographed from below the land surface.

As described above, in the target 10, the angle, by which a vector from the standard point member 34 (the second standard point) to the standard point member 36 (the third standard point) is rotated-in the counterclockwise direction from a vector from the standard point member 34 to the standard point member 31 (the first standard point), is predetermined. Further, the digital image data used in this embodiment is converted from an image photographed by the camera at the spot of the photommetric analytic measurement, with the target 10 set approximately horizontally. Accordingly, it can be judged if a combination of the selected first points range and the selected second points range should be extracted, by checking if the combination meets the condition of the angle in step S1070.

If a selected combination meets the condition of step S1070, the selected combination meets the positional relationship between the standard point members 31, 34, 36 and the assistant point members 32, 33, 35 of the target 10. Accordingly, the process goes to step S1078, in which a predetermined operation for a case in which the extraction of the standard points has succeeded, is performed.

On the other hand, if the angle $\theta$ is smaller than the greatest lower bound Th3 or larger than the least upper bound Th4, the process goes to step S1072. In step S1072, if it is judged that there are any second points range which have not been selected, the process returns to step S1062 and the procedures after step S1062 are repeated. In step S1072, if it is judged that all second points range have been selected, the process goes to step S1074. In step S1074, if it is judged that there are any first points range which have not been selected, the process returns to step S1060 and the procedures after step S1060 are repeated.

As described above, until the combination, which meets the conditions of steps S1064 and S1068, is selected, the procedures from step S1060 through step S1070 are repeatedly performed, each time changing a combination of the first and the second points ranges. If there is no combination which meets the conditions of steps S1064 and S1068, the process goes to step S1076 and a predetermined operation for a case in which the extraction of the standard points has failed, is performed. The extraction of the standard points is ended.

As described above, until a combination of the first and second points ranges, which meets the positional relationship between the standard point members 31, 34, 36 and the assistant point members 32, 33, 35, is found, the procedures from step S1060 through step S1074 are repeatedly performed. If the combination is found, the procedures from step S1060 through step S1074 cease to be performed and the selection of combinations of the registered first points range and the registered second points range is ended.

For example, with respect to the combination of the set of groups G1, G2, G3 and the set of groups G3, G4, G5, G6, in FIG. 13, the angle by which the vector from the variable A2 to the variable A3 is rotated from the vector from the variable A2 to the variable A1, is larger than the greatest lower bound Th3, being smaller than the least upper bound Th4. Accordingly, the combination of the set of groups G1, G2, G3 and the set of groups G3, G4, G5, G6 is extracted as the combination which meets the positional relationship of the standard point members 31, 34, 36 and the assistant point members 32, 33, 35.

Note that, in this embodiment, the four points range is treated as the first points range and the three points range is treated as the second points range. However, the three points range can be treated as the first points range and the four points range can be treated as the second points range.

Further, the above mentioned extraction of the combination can be performed in this embodiment, using a target, in which a number of the assistant point members, lying on the straight line connecting the first and second standard point members, equals a number of the assistant point members, lying on the straight line connecting the second and third standard point members.

For example, if one assistant point member lies on both the straight line connecting the first and second standard point members and the straight line connecting the second and third standard point members, the first points range and the second points range are treated as three points range in the above mentioned steps S1046 and S1050. Accordingly, the extraction of the combination is performed, after a set of the first standard point member, the second standard point member, and the assistant point member between the first and second standard point members is registered as the first points range and the second points range, and a set of the second standard point member, the third standard point member, and the assistant point member between the second and third standard point members is registered as the first points range and the second points range. Namely, each of the first points range and the second points range can be composed of not less than three points.

When the target, in which the number of the assistant point members on the first and second straight lines is equal to each other, is used in this embodiment, the first standard point member and the third standard point member can be identified by checking if the angle, by which the vector from the second standard point member to the third standard point member is rotated in the counterclockwise direction from the vector from the second standard point member to the first standard point member, is within the predetermined limits. Namely, the identification of the first and third standard point members can be done by performing the procedures of steps S1068 and S1070 of the flowcharts of FIG. 15.

Namely, if the number of the assistant point members on the first and second straight lines is equal, two combinations meet the condition of step S1062. In one combination, one standard point member, which should be selected as the first standard point member, is selected as the first standard point member, and another standard point member, which should be selected as the third standard point member, is selected as the third standard point member. In another combination, one standard point member, which should be selected as the first standard point member, is selected as the third standard point member, and another standard point member, which should be selected as the third standard point member, is selected as the first standard point member.

As described above, the latter combination does not meet the angle condition of step S1070. In other words, only the former combination meets the angle condition of step S1070, and then the process goes to step S1078.

Figure 16:
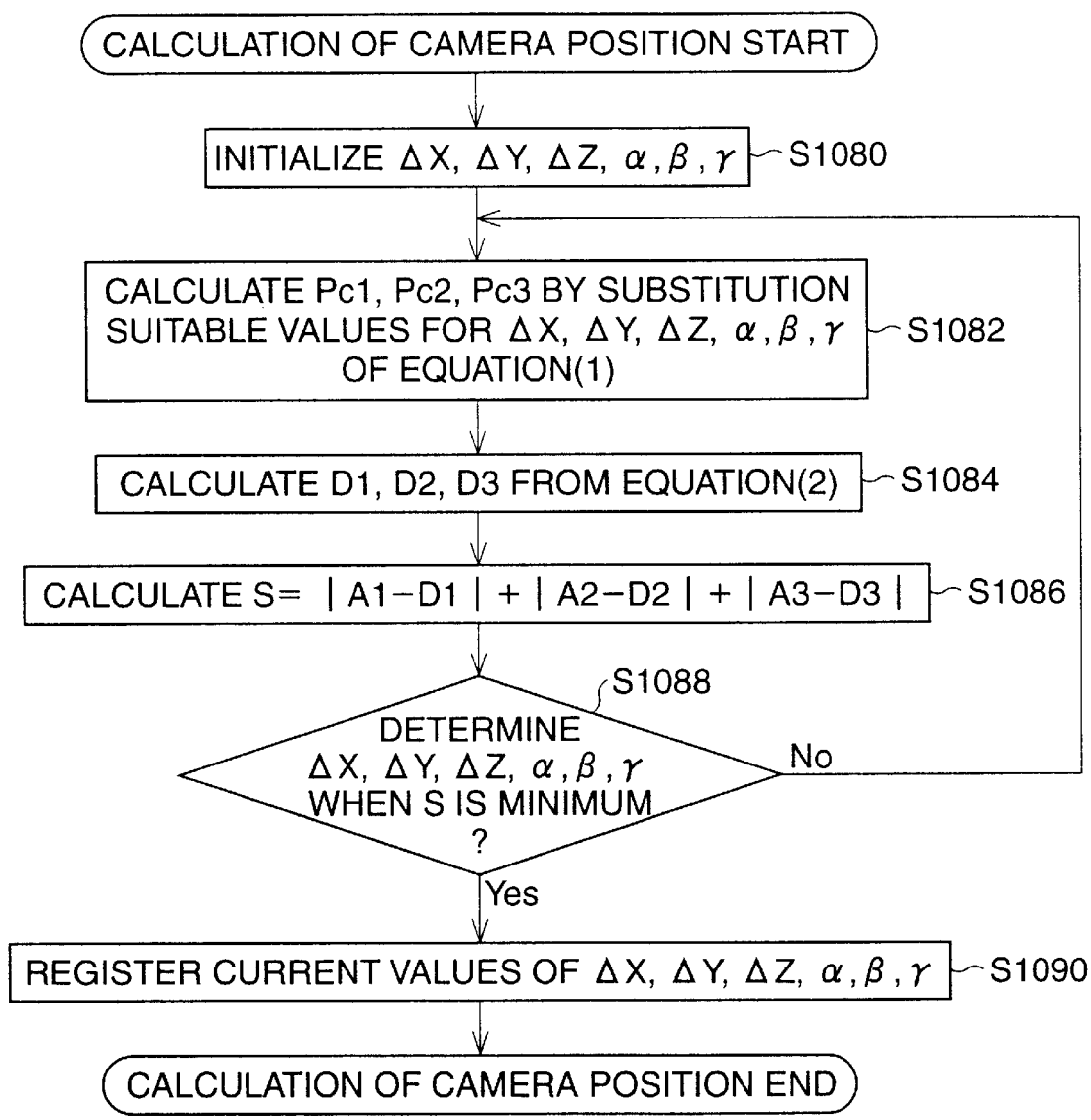
FIG. 16 is a flowchart of procedures of calculation of a camera position.

When the extraction of the combination of the groups is ended, the process goes to step S1016 of the flowchart of FIG. 11, in which a calculation of a camera position is performed. FIG. 16 shows a flowchart of a calculation routine of the camera position. In step S1080, variables $\Delta X$, $\Delta Y$, $\Delta Z$, $\alpha$, $\beta$ and $\gamma$ of the aforementioned equation (1) are initialized.

In step S1082, (–L, 0, 0), (0, 0, 0), (0, 0, L) are respectively substituted for Ps1, Ps2, Ps3 of the aforementioned equation (1), and suitable values are respectively substituted for the variables $\Delta X$, $\Delta Y$, $\Delta Z$, $\alpha$, $\beta$ and $\gamma$. Then, three-dimensional coordinates of the standard point members 31, 34 and 36 in the camera coordinate system, namely Pc1 ($Pcx_1$, $Pcy_1$, $Pcz_1$), Pc2($Pcx_2$, $Pcy_2$, $Pcz_2$) and Pc3($Pcx_3$, $Pcy_3$, $Pcz_3$) are calculated.

In step S1084, three-dimensional coordinates of Pc1, Pc2, Pc3 calculated in step S1082, are substituted for Pc1, Pc2 and Pc3 of the aforementioned equation (2). Then, two-dimensional coordinates of D1($Dx_1$, $Dy_1$), D2($Dx_1$, $Dy_1$), D3($Dx_1$, $Dy_1$) in the photograph coordinate system are calculated.

In step S1086, two-dimensional coordinates of A1, A2, A3 in the photograph coordinate system, which are automatically extracted from the digital image data, are compared with D1, D2, D3 calculated from the equations (1) and (2). Namely, an absolute value of difference between D1 and A1, an absolute value of difference between D2 and A2, an absolute value of difference between D3 and A3 are calculated, and the sum S of the absolute values is calculated.

In step S1088, it is checked if the sum S is at a minimum. If the sums S is not at a minimum, the procedures from step S1082 through step S1086 are repeated after each value of $\Delta X$, $\Delta Y$, $\Delta Z$, $\alpha$, $\beta$, $\gamma$ is changed. Namely, values of $\Delta X$, $\Delta Y$, $\Delta Z$, $\alpha$, $\beta$, $\gamma$, by which the sum S is at a minimum, are calculated by least squares method.

If it is judged that the sum S is at a minimum in step S1088, the process goes to step S1090. In step S1090, the values of $\Delta X$, $\Delta Y$, $\Delta Z$, $\alpha$, $\beta$, $\gamma$ are registered as parameters which define the positional data of the camera, and the calculation of the positional data of the camera is ended.

The above mentioned procedures of the flowcharts shown in FIGS. 11, 12, 14, 15 and 16 is the calculation of the two-dimensional coordinates of the standard points of the target and the positional data of the camera, in the photogrammetric analytic measurement. Namely, the above mentioned procedures correspond to, for example, procedures of flowcharts from step 1201 through step 1211 shown in FIG. 12 of U.S. application Ser. No. 09/017,237. Due to the above mentioned procedures, calculation of three-dimensional coordinates of reference points (correspond to the standard points in this embodiment) of step 1211 can be accurately performed without being affected by the skill of an operator, as designation of the reference points of step 1208 is automatically performed.

As described above, according to this embodiment, the angle, by which the straight line connecting the standard point members 34, 36 is rotated in the counterclockwise direction from the straight line connecting the standard point members 34, 31, is between the predetermined limits. Namely, the angle, by which the second bar 14 is rotated in the counterclockwise direction from the first bar 12, is within the predetermined limits. Further, the reflecting sheet is attached on the standard point members 31, 34, 36 and the assistant point members 32, 33, 35. Accordingly, it is easy to determine the positions of the standard point members and the assistant point members, in the photographed picture, so that two-dimensional coordinates of the standard point members in the digital image are automatically calculated.

Further, according to this embodiment, the angle defined by the first bar 12 and the second bar 14 is determined, and further, the length between the standard point members 31, 34 and the length between the standard point members 34, 36 are determined. Therefore, the three-dimensional coordinates of the standard point members in the scene coordinate system are predetermined, so that the three-dimensional coordinates of the standard point members in the photograph coordinate system can be calculated based on the three-dimensional coordinates in the scene coordinate system. Accordingly, the positional data of the camera is automatically calculated by comparing the two-dimensional coordinates of the standard point members in the photograph coordinate system with the two-dimensional coordinates of the standard point members in the digital image.

As described above, according to the present invention, the positional data of a camera is automatically calculated in the photogrammetric analytic measurement.

The present disclosure relates to subject matter contained in the following Japanese patent application No.11-052525 (filed on Mar. 1, 1999), which is expressly incorporated herein, by reference, in its entirety.

What is claimed is:

1. A device for calculating positional data of standard points of a target of photogrammetric analytic measurement comprising:

an image data obtaining processor that photographs an object of photogrammetric analytic measurement together with a target that has a first standard point and a second standard point and a third standard point to obtain an image, said first standard point, said second standard point and said third standard point of the target being positioned with a predetermined interval between, at least one assistant point being provided on said target on each of a first straight line, connecting said first standard point and said second standard point, and a second straight line, connecting said second standard point and said third standard point, said first straight line and said second straight line of said target defining a first predetermined angle therebetween, said first predetermined angle appearing as a second predetermined angle in said image; and a value of two-dimensional coordinates calculating processor that, when said second predetermined angle is within a predetermined limit that is determined in accordance with the possible second predetermined angles that can appear in an image that includes said target having said first predetermined angle, calculates each two-dimensional coordinate value of said first standard point, said second standard point and said third standard point in a photograph coordinate system that is a two-dimensional coordinate system of a photographed image, obtained by said image data obtaining processor.

2. The device of claim 1, wherein said first standard point, said second standard point, said third standard point and said at least one assistant point provided on each of said first straight line and said second straight line are made of a reflecting material, such that said first standard point, said second standard point, said third standard point and each of said at least one assistant point have a relatively higher brightness than other objects in said photographed image, and said value of two-dimensional coordinates calculating processor is provided with:

a binarization processor that classifies each pixel composing of digital image data of said photographed image into a high brightness class and a low brightness class after comparing a brightness of each pixel with a predetermined threshold value;

a group extracting processor that extracts groups in which a plurality of said pixels of said high brightness class sequentially exist in said digital image data, an area of which is within a predetermined range;

a calculating processor that calculates a value of two-dimensional coordinates of a center of gravity of each of said groups, based on said brightness of each pixel composing said groups and on a value of coordinates of said each pixel in said photograph coordinate system;

a first points range extracting processor that extracts a first points range on which a plurality of said centers of gravity lie, a number of said plurality of said centers of gravity on said first points range being equal to a total point number including said first standard point, said second standard point and said number of said at least one assistant points on said first straight line;

a second points range extracting processor that extracts a second points range on which a plurality of said centers of gravity lie, a number of said plurality of said centers of gravity on said second points range being equal to a total point number including said second standard point, said third standard point and said number of said at least one assistant points on said second straight line;

a combination extracting processor that extracts a combination of said first points range and said second points range in which an angle defined by said first points range and said second points range is within said predetermined limit; and a standard point determining processor that determines a center of gravity of an end point of said first points range extracted by said combination extracting processor, being opposite to an identical end point shared by said first points range and said second points range extracted by said combination extracting processor, as said first standard point, determines said center of gravity of said identical end point shared by said first points range and said second points range extracted by said combination extracting processor, as said second standard point, and determines a center of gravity of an end point of said second points range extracted by said combination extracting processor, being opposite to said identical end point shared by said first points range and said second points range extracted by said combination extracting processor, as said third standard point.

3. The device of claim 2, wherein said predetermined angle defined by said first straight line and said second straight line is an angle by which said second straight line is rotated in the counterclockwise direction from said first straight line.

4. The device of claim 3, wherein said predetermined limit is larger than 0 degrees, and smaller than 180 degrees.

5. The device of claim 4, wherein said target is a single member comprising connectable members on which said first standard point, said second standard point, said third standard point, said at least one assistant point on said first straight line, and said at least one assistant point on said second straight line, are fixed.

6. A method for calculating positional data of standard points of a target of photogrammetric analytic measurement comprising:

a first step that photographs an object of photogrammetric analytic measurement together with a target that has a first standard point and a second standard point and a third standard point, by a camera, to obtain an image, said first standard point, said second standard point and said third standard point of the target being positioned with a predetermined interval between, at least one assistant point being provided on said target on each of a first straight line, connecting said first standard point and said second standard point, and a second straight line, connecting said second standard point and said third standard point, said first straight line and said second straight line defining a first predetermined angle therebetween, said first predetermined angle appearing as a second predetermined angle in said image; and a second step that, when said second predetermined angle is within a predetermined limit that is determined in accordance with the possible second predetermined angles that can appear in an image that includes said target having said first predetermined angle, calculates each two-dimensional coordinate value of said first standard point, said second standard point and said third standard point in a photograph coordinate system that is a two-dimensional coordinate system of a photographed image photographed by said camera.

7. The method of claim 6, wherein said target is a single member comprising connectable members on which said first standard point, said second standard point, said third standard point, said at least one assistant point on said first straight line, and said at least one assistant point on said second straight line, are fixed.

8. The method of claim 6, wherein said predetermined angle defined by said first straight line and said second straight line is an angle by which said second straight line is rotated in the counterclockwise direction from said first straight line.

9. A recording medium in which a calculating program of standard points of a target of photogrammetric analytic measurement is stored, said target having a first standard point and a second standard point and a third standard point, and said target being photographed together with an object of photogrammetric analytic measurement;

said first standard point, said second standard point and said third standard point of said target being positioned with a predetermined interval between, at least one assistant point being provided on said target on each of a first straight line, connecting said first standard point and said second standard point, and a second straight line, connecting said second standard point and said third standard point, said first straight line and said second straight line defining a predetermined first angle therebetween, said first predetermined angle appearing as a second predetermined angle in said image, said calculating program comprising:

a values of two-dimensional coordinate calculating routine that, when said second predetermined angle is within a predetermined limit that is determined in accordance with the possible second predetermined angles that can appear in an image that includes said target having said first predetermined angle, calculates each two-dimensional coordinate value of said first standard point, said second standard point and said third standard point in a photograph coordinate system that is a two-dimensional coordinate system of a photographed image.

10. The recording medium of claim 9, wherein said target is a single member comprising connectable members on which said first standard point, said second standard point, said third standard point, said at least one assistant point on said first straight line, and said at least one assistant point on said second straight line, are fixed.

11. The recording medium of claim 9, wherein said predetermined angle defined by said first straight line and said second straight line is an angle by which said second straight line is rotated in the counterclockwise direction from said first straight line.

* * * * *